United States Patent
Micko et al.

(10) Patent No.: US 12,313,861 B1
(45) Date of Patent: May 27, 2025

(54) FRESNEL LENS WITH VARIABLE-ANGLE TRANSLATION EDGES

(71) Applicant: Amazon Technologies, Inc., Seattle, WA (US)

(72) Inventors: Eric S. Micko, San Jose, CA (US); Sonny Windstrup Rasmussen, Singapore (SG)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 17/990,200

(22) Filed: Nov. 18, 2022

Related U.S. Application Data

(60) Provisional application No. 63/419,297, filed on Oct. 25, 2022.

(51) Int. Cl.
*G02B 3/08* (2006.01)
*G02B 3/00* (2006.01)

(52) U.S. Cl.
CPC ............. *G02B 3/08* (2013.01); *G02B 3/0037* (2013.01); *G02B 3/0043* (2013.01); *G02B 3/005* (2013.01)

(58) Field of Classification Search
CPC ...... G02B 3/08; G02B 3/0043; G02B 3/0037; G02B 3/005
USPC ......................................................... 359/742
See application file for complete search history.

(56) References Cited

U.S. PATENT DOCUMENTS

| | | | | |
|---|---|---|---|---|
| 4,859,043 | A * | 8/1989 | Carel | F21V 5/045 359/742 |
| 5,428,388 | A | 6/1995 | von Bauer et al. | |
| 6,654,172 | B2 * | 11/2003 | Pond | F21S 43/14 359/743 |
| 10,578,949 | B2 * | 3/2020 | Coughenour | G02B 3/08 |
| 10,930,126 | B1 * | 2/2021 | Jeong | H04N 23/611 |
| 2005/0041307 | A1 * | 2/2005 | Barone | G02B 3/08 359/742 |
| 2007/0008081 | A1 | 1/2007 | Tylicki et al. | |
| 2010/0225455 | A1 | 9/2010 | Claiborne et al. | |
| 2014/0267716 | A1 | 9/2014 | Child et al. | |
| 2015/0163463 | A1 | 6/2015 | Hwang et al. | |

\* cited by examiner

*Primary Examiner* — Laura K Tso
(74) *Attorney, Agent, or Firm* — Eversheds Sutherland (US) LLP

(57) ABSTRACT

A lens assembly includes a lens housing and a Fresnel lens array. The lens housing includes a first portion that defines an exterior surface and an interior surface, and a second portion. The second portion defines a cavity, where the interior surface is disposed within the cavity. The Fresnel lens array is disposed within the cavity and coupled to the interior surface. The Fresnel lens array includes a first lens element and a second lens element. The first lens element has first concentric grooves defined by first translation edges and first facets. The first translation edges are disposed at thirty degrees relative to a first center point of the first concentric grooves. The second lens element has second concentric grooves defined by second translation edges and second facets. The second translation edges are disposed at one degree relative to a second center point of the second concentric grooves.

27 Claims, 16 Drawing Sheets

FRESNEL LENS WITH VARIABLE-ANGLE TRANSLATION EDGES

CROSS REFERENCE TO RELATED APPLICATIONS

This application claims priority to U.S. Provisional Application No. 63/419,297, filed Oct. 25, 2022, entitled "Fresnel Lens with Variable-Angle Translation Edges," the entirety of which is herein incorporated by reference.

BACKGROUND

Home security is a concern for many homeowners and renters. Some systems and devices include motion sensors that activate camera(s), light(s), and/or other components when motion is detected in an effort to deter would-be intruders. Unfortunately, these systems and devices may have a limited a field of view (FoV) that impacts their motion detection. In such instances, the systems and devices may fail to adequately monitor their intended environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The devices and systems depicted in the accompanying figures are not to scale and components within the figures may be depicted not to scale with each other.

DETAILED DESCRIPTION

Figure 1:
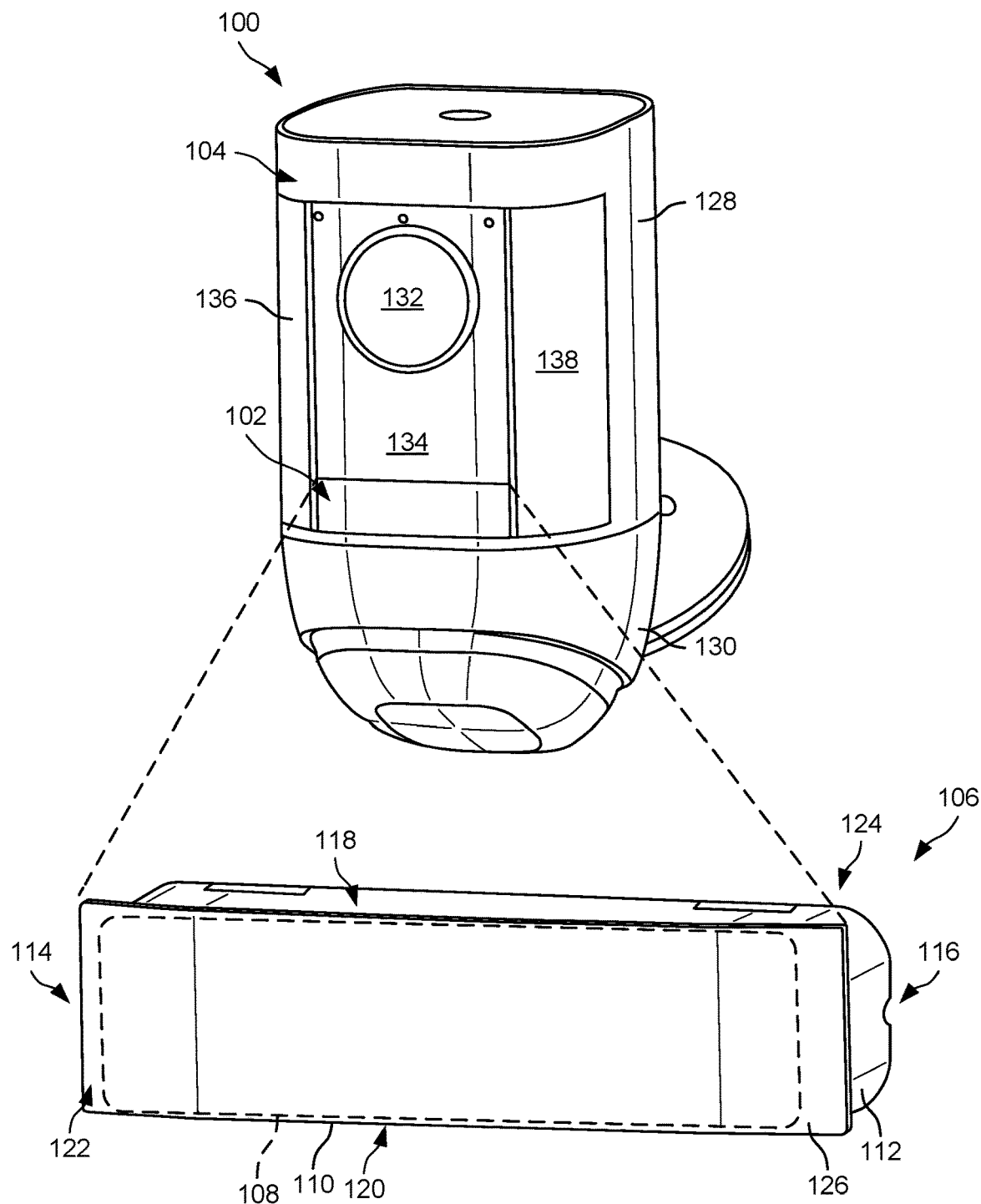
FIG. 1 illustrates a front perspective view of an example lens assembly for an example device, according to an example of the present disclosure.

Fresnel lenses are commonly used in optics as a way to focus infrared light. Conventionally, Fresnel lenses include a smooth exterior surface and an interior surface having concentric grooves that direct (e.g., refract) light rays towards an IR sensor (e.g., detector). The concentric grooves may be defined by facets and translation edges, and in traditional Fresnel lenses, the translation edges are disposed at, or approximately, one degree relative to a central axis/plane of the Fresnel lens. As light rays contact the exterior surface, the light rays pass through the Fresnel lens and exit the Fresnel lens at the interior surface. Exit mainly occurs via facets on the lens' interior surface, after which the IR sensor(s) receive the light rays focused by the Fresnel lens. However, for light rays having off-axis incident angles, such as being non-normal to the exterior surface of the Fresnel lens, these light rays may fail to be directed to the IR sensor(s). For example, after passing through the Fresnel lens' exterior surface traveling through the Fresnel lens and exiting at the Fresnel lens' interior surface, given the angle of the translation edges, the light rays may contact the translation edges on the interior surface. Here, the light rays may refract once again and fail to be directed to the IR sensor(s). Thus, light rays having high incident angles relative to the central axis/plane may fail to be focused. In these scenarios, the IR sensor(s) may fail to detect a significant portion of the lens-incident light rays, which may lead to a lessened FoV and/or motion detection.

In light of the above, this application is directed, at least in part, to a Fresnel lens array that enables IR sensor(s) to capture light rays with off-axis incident angles and/or high incident angles relative to the exterior surface and/or the central vertical axis/plane. In some instances, the Fresnel lens array includes a frontal surface and a rearward surface opposite the frontal surface. A thickness of the Fresnel lens array extends between the frontal surface and the rearward surface. In some instances, the frontal surface may be substantially planar (e.g., flat) across a width and/or height of the Fresnel lens, while the rearward surface may include concentric grooves, such as the facets and translation edges, that form the Fresnel lens array. For example, the concentric grooves may be etched, milled, cut, molded, or otherwise formed within the rearward surface. In some instances, the Fresnel lens array may be substantially rectangular.

In some instances, the Fresnel lens array may include a plurality of individual lens elements (e.g., segments) that collectively form the Fresnel lens array. In some instances, a first portion of the lens elements may have translation edges that are disposed at, or approximately, thirty degrees relative to a central axis (or plane) of the Fresnel lens array. In some instances, the translation edges have a length and/or width of 5 micrometers. In some instances, the translation edges are disposed relative to a center point of concentric grooves of the individual lens. By orienting the translation edges at such angle, the off-axis light rays (e.g., light that is off-axis relative to the central axis/plane and/or the exterior surface of the Fresnel lens array) may avoid being refracted by the facets and/or the translation edges once the off-axis light rays pass through the Fresnel lens array. In turn, the off-axis light rays may be directed to the IR sensor(s). Additionally, a second portion of the lens elements may have translation edges that are disposed at, or approximately, one degree relative to the central axis of the Fresnel lens array. In doing so, the Fresnel lens array may direct on-axis light rays (e.g., light that is on-axis relative to the central axis) to the IR sensor(s). The Fresnel lens array may therefore direct both on-axis light rays and off-axis light rays to the IR sensor(s).

The location of the lens elements within the Fresnel lens array having the thirty degree translation edges, as well as the location of the lens elements having the one degree translation edges, may be selected based on a desired field of view (FoV) of the IR sensor(s). For example, in some instances, the Fresnel lens array may include eighteen individual lens elements that are assembled together to form the Fresnel lens array. That is, in some instances, the lens elements may be individually formed, and thereafter, may be assembled together to form the Fresnel lens array. These individual lens elements, as noted above, include respective concentric grooves having the thirty degree translation edges or the one degree translation edges. As such, when assembled, the Fresnel lens array includes both the thirty degree translation edges and one degree translation edges. The location of the lens elements that have the thirty degree translation edges, and the location of the lens elements that have the one degree translation edges, may be based on the desired FoV of the IR sensor(s).

In some instances, given the differing angles of translation edges, the shape of the lens elements, the size of the lens elements, and/or the number of concentric grooves within the individual lens elements, the Fresnel lens array may include multiple focal lengths. Stated alternatively, the lens elements may include different focal lengths. However, the lens elements that make up the Fresnel lens array may have a common focal point for sensing via the IR sensor(s). As such, the IR sensor(s) may be located at the focal point.

In some instances, the Fresnel lens array is configured to direct the light rays to two IR sensors. For example, the Fresnel lens array may include a first half (or section, portion, segment, etc.) that directs first light rays towards a first IR sensor. A second half (or section, portion, segment, etc.) may direct second light rays towards a second IR sensor. The Fresnel lens array may be symmetrical about the central axis/plane, such that the first half includes the same (or similar) lens elements (and translation edges) as the second half. Although described as directing light rays to two IR sensors, a device (or other system) employing the Fresnel lens array may include more than or less than two IR sensors. Additionally, the Fresnel lens array may direct light rays to sensors other than IR sensors.

As introduced above, the lens elements may couple to one another in order to form the Fresnel lens array. In some instances, the lens elements may be adhered to one another, bonded to one another, sonically welded to one another, and so forth. However, although described as being separate lens elements that are individually formed from separate pieces of material, in some instances, the Fresnel lens array may be made up of a single piece of material, and the lens elements with the different concentric grooves may be formed within the single piece of material. In this instance, the individual lens elements may not be coupled together to form the Fresnel lens array, but the Fresnel lens array may include a unitary structure with the different concentric grooves being formed therein.

In some instances, the individual lens elements may include different or similar shapes and/or sizes compared to one another. For example, certain lens elements may be square-shaped, while other lens elements may be rectangular-shaped. The square-shaped and/or the rectangular-shaped lens elements may include the thirty degree translation edges and/or the one degree translation edges. The center point of the individual lens elements may also be different from one another. That is, a center point of the concentric grooves, around which the concentric grooves are disposed, may be at different locations, where the translation edges and the facets are disposed about the center points, respectively. As such, the concentric grooves across the lens elements may be different than one another. Moreover, between the lens elements, the translation edges and/or the facets may include different lengths, and/or certain lens elements may include more translation edges and/or facets than others. In some instances, the facets have a width and/or a length of 10 micrometers.

Although the translation edges are described as being thirty degrees, or approximately thirty degrees, other angles are envisioned. For example, the translation edges may be disposed at ten degrees, twenty degrees, forty degrees, and so forth. The angle of the translation edges may be based at least in part on a desired FOV of the IR sensor(s). Additionally, in some instances, the individual lens elements may have a combination of differently angled translation edges. For example, a lens element included within the Fresnel lens array may include both translation edges disposed at thirty degrees and one degree. As such, lens elements are designed to direct light rays from different directions, or incident angles on the exterior surface, to the IR sensor(s) in order to monitor a desired FoV.

In some instances, the Fresnel lens array may be disposed within a lens housing. The lens housing may in turn couple the Fresnel lens array to a device having the IR sensor(s). In some instances, the lens housing includes a cavity within which the Fresnel lens array is at least partially disposed and/or within which the IR sensor(s) at least partially reside. Additionally, the lens housing may include an exterior surface that forms at least part of an exterior surface of the device, and an interior surface disposed at least partially within the cavity. The Fresnel lens array may couple to the interior surface, such that the Fresnel lens array may be disposed within the cavity. For example, the frontal surface of the Fresnel lens array may couple to the interior surface of the lens housing. The interior surface may be substantially planar for receiving the substantially planar frontal surface of the Fresnel lens array.

Given that the Fresnel lens array couples to the interior surface of the lens housing, the lens housing may permit transmission of light rays. For example, the lens housing may be formed of a material that permits the transmission of light rays to the Fresnel lens array. Alternatively, in some instances, the lens housing may include different materials, but a section (e.g., pane) of the lens housing may permit the light rays to travel therethrough. In some instances, the lens housing may permit an undistorted transmission of mid-IR wavelength to the Fresnel lens array. In some instances, the lens housing may be manufactured from high-density polyethylene (HDPE) and may be manufactured via injection molding. Once formed, the Fresnel lens array may couple to the interior surface of the lens housing.

In some instances, the lens housing may include curved regions disposed at lateral sides thereof. For example, the lens housing may include a first side and a second side spaced apart from the first side across a width of the lens housing. In some instances, the lens housing may include a first curved region disposed proximate to the first side, and a second curved region disposed proximate to the second side. The first curved region may extend a first length across the width of the lens housing, while the second curved region may extend a second length across the width of the lens housing. The first length and the second length may be equal. A middle region may be disposed between the first curved region and the second curved region, and may be substantially planar. The curved regions of the lens housing may increase a FoV of the IR sensor(s), but that off-axis light rays having a high incident angle relative to the central axis of the Fresnel lens array and/or the exterior surface of the Fresnel lens array may be directed to the IR sensor(s). In some instances, the interior surface of the lens housing includes curved surfaces, and in such instances, the front surface and/or the rearward surface may include curved sections that are complimentary to the curved regions.

In some instances, the Fresnel lens array, as well as the IR sensor(s), may be components of a device configured to detect motion within an environment. The device may include additional components, such as camera(s), loudspeaker(s) (e.g., tweeter, mid-range, etc.), microphone(s), network interface(s) (e.g., Wi-Fi, Cellular, etc.), radar sensor, and so forth. In some instances, the device may be configured to record video data and/or image data in response to detecting motion within an environment. For example, as the IR sensor(s) may be used to detect motion, once motion is detected, the device may begin capturing video data via the camera(s). In some instances, the device 100 may include that described in, for example, U.S. patent application Ser. No. 17/953,780, filed Sep. 27, 2022, entitled "Security Camera Device," the entirety of which is herein incorporated by reference in its entirety and for all purposes.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates a front perspective view of an example device 100 having an example lens assembly 102, according to examples of the present disclosure. In some instances, the device 100 may represent an electronic device, audio/video (A/V) device, and so forth configured to capture audio and/or video within an environment of the device 100. In some instances, the lens assembly 102 is disposed on a front 104 of the device 100.

In some instances, the lens assembly 102 includes a lens housing 106 and a Fresnel lens array 108 coupled to the lens housing 106. In some instances, the lens housing 106 includes a first portion 110 and a second portion 112. The first portion 110 may correspond to a pane through which light rays pass, while the second portion 112 may correspond to a frame that couples the lens assembly 102 to the device 100. As will be explained herein, the Fresnel lens array 108 may be disposed beneath (e.g., in the Z-direction) at least part of the first portion 110 in order to receive the light rays and direct the light rays towards IR sensor(s) of the device 100. In FIG. 1, the Fresnel lens array 108 is shown in dashed lines to indicate a position of the Fresnel lens array 108 being within the lens housing 106 (e.g., beneath or behind part of the first portion 110).

The second portion 112 may also position the IR sensor(s) for receiving the light rays via the Fresnel lens array 108. For example, the IR sensor(s) may be at least partially disposed within the second portion 112, and the IR sensor may be oriented in a direction towards the first portion 110 (e.g., towards the front 104 of the device 100). As shown, the second portion 112 may extend from the first portion 110. In some instances, the first portion 110 and the second portion 112 are coupled together, or represent a unitary body formed from a common material (e.g., injection molded).

The lens housing 106 may include a first side 114, a second side 116 spaced apart from the first side 114 (e.g., in the X-direction), a top 118, a bottom 120 spaced apart from the top 118 (e.g., in the Y-direction), a front 122, and a back 124 spaced apart from the front 122 (e.g., in the Z-direction). The front 122 includes an exterior surface 126 that forms a portion of an exterior surface of the device 100. The exterior surface 126 may be formed via the first portion 110 of the lens housing 106.

The device 100 may include one or more IR sensor(s) disposed beneath the lens assembly 102 (e.g., within the device 100) and which are configured to receive light rays via the Fresnel lens array 108. For example, to sense motion within the environment, the light rays may pass through portions of the lens assembly 102 to the IR sensor(s). In some instances, the IR sensor(s) may represent passive IR (PIR) sensor(s). A PIR sensor may include, for example, two pyroelectric sensing elements. Each pyroelectric sensing element may comprise a pyroelectric crystal that generates an electrical charge in response to a change in temperature. Radiation (e.g. infrared light) received at a surface of a pyroelectric sensing element causes a change in temperature, which, in turn, generates an electrical charge. Stated alternatively, an absorbing layer of a pyroelectric sensing element transforms radiation flux change into a change in temperature and a pyroelectric component performs a thermal to electrical conversion. One or more low-noise and low leakage current field-effect transistors (e.g. a JFET) or operational amplifiers are used to convert charge into a signal voltage.

In some instances, the two pyroelectric sensing elements may be electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

In some instances, the PIR sensor may include two slots, each providing an optical path to one of the pyroelectric sensing elements. As discussed herein, the Fresnel lens array 108 is configured to direct light received at the Fresnel lens array 108 onto one of the pyroelectric sensing elements. In some instances, such as in the case that the device 100 includes two PIR sensors, the Fresnel lens array 108 is configured to direct light received at a first portion of the Fresnel lens array 108 (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The PIR sensors may be analog, with an analog signal output, or may be digital, with digital data output generated utilizing an analog-to-digital converter (ADC).

The device 100 may include the PIR sensors to detect objects. Each PIR sensor may output a signal or sensor data, where the device 100 uses a characteristic determined using the signal or sensor data to determine whether the PIR sensor detected an object. The characteristic may include a voltage represented by the signal or sensor data, an amplitude of a wave generated or determined using the signal or sensor data, an angle of the wave generated using the signal or sensor data, and/or the like.

In accordance with one or more preferred implementations, a PIR sensor includes an integrated circuit (IC) component that receives voltage inputs from one or more lines coupled to a first PIR sensing element and a second PIR sensing element. In accordance with one or more preferred implementations, the IC component receives an input from each sensing element, while in accordance with one or more preferred implementations, the IC component receives a summed voltage.

In accordance with one or more preferred implementations, the IC component determines whether a summed voltage exceeds a first threshold, and, if so, sends a logic signal (e.g. a Boolean value or an interrupt) to a controller (e.g. a microcontroller unit or MCU) of an electronic device. Based on the received logic signal, the controller begins periodically polling or requesting PIR data (e.g. a most recent data value at the time of polling) from the IC component. For example, the controller may poll the IC component at a rate of 64 Hz.

In some instances, the lens assembly 102 is located on a first housing 128 of the device 100. A second housing 130 may couple to the first housing 128. The first housing 128, as well as the second housing 130, may include additional components to permit an operation of the device 100. For example, the device 100 may include a camera, lighting elements, a radar sensor, and so forth. In some instances, the camera is disposed beneath a camera lens 132, the radar sensor may be disposed beneath a first cover 134, first lighting element(s) may be disposed beneath a second cover 136, and second lighting element(s) may be disposed beneath a third cover 138. As shown, the lens assembly 102 may be located vertically beneath the camera lens 132 and the first cover 134, and between the second cover 136 and the third cover 138. Additional components of the device 100, as well as their function, are described in U.S. patent application Ser. No. 17/953,780, filed Sep. 27, 2022, entitled "Security Camera Device," the entirety of which is herein incorporated by reference in its entirety and for all purposes.

Figure 2:
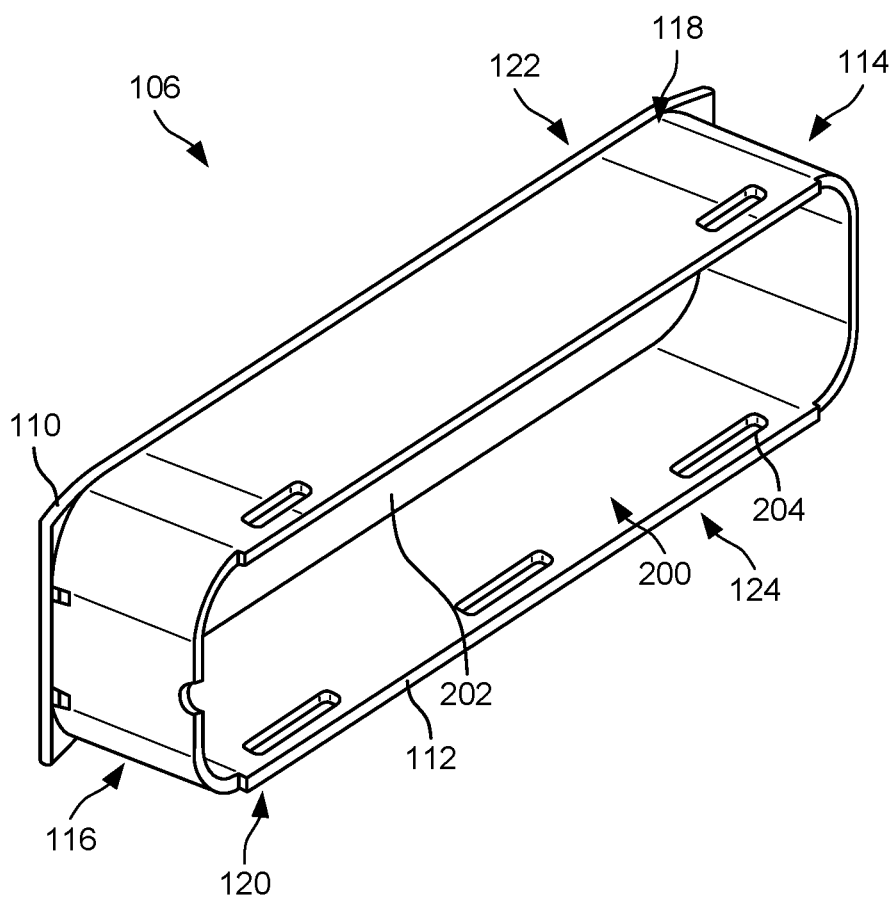
FIG. 2 illustrates a rear perspective view of an example lens housing of the lens assembly of FIG. 1, according to an example of the present disclosure.

FIG. 2 illustrates a rear perspective view of the lens housing 106, according to examples of the present disclosure. The lens housing 106 is shown including or defining a cavity 200. The cavity 200 may be disposed between the front 122 and the back 124, between the first side 114 and the second side 116, and/or between the top 118 and the bottom 120. As shown, the cavity 200 is open at the back 124.

In some instances, the lens housing 106 includes the first portion 110 and the second portion 112. As shown, the second portion 112 may extend from the first portion 110 (e.g., transverse thereto). In some instances, the second portion 112 forms at least part of the cavity 200. That is, as shown, the second portion 112 may include sidewalls or a body that extends along the top 118, the bottom 120, the first side 114, and the second side 116 of the lens housing 106. When coupled to the device 100, the IR sensor(s) may be disposed at least partially within the second portion 112 of the lens housing 106. For example, the IR sensor(s) may at least partially reside within the cavity 200, interior to the second portion 112. However, the IR sensor(s) may also extend out the back 124 of the second portion 112 for coupling to frames and other mounts of the device 100.

The first portion 110 includes the exterior surface 126 oriented towards the environment, and an interior surface 202 oriented towards the back 124. The Fresnel lens array 108, although shown removed in FIG. 2, may couple to the interior surface 202 of the lens housing 106, within the cavity 200. For example, the Fresnel lens array 108 may include a frontal surface and a rearward surface, where the frontal surface couples to the interior surface 202, or a portion thereof. The rearward surface includes concentric grooves (e.g., annular rings with a curved profile) with peaks and valleys that act as individual refracting surfaces to direct the light rays to the IR sensor(s). The lens housing 106, or at least the first portion 110, is transmissive to light (e.g., IR light).

The second portion 112 of the lens housing 106 may include slots 204 for coupling the second portion 112 (and in turn the lens assembly 102) to the device 100. For example, tabs or prongs of mounts or brackets of the device 100 may be inserted into, and received by, the slots 204. As shown, the slots 204 may be disposed across the top 118 and/or the bottom 120 of the lens housing 106.

Figure 3A:
FIG. 3A illustrates a front planar view of the lens housing of FIG. 2, according to an example of the present disclosure.
Figure 3B:
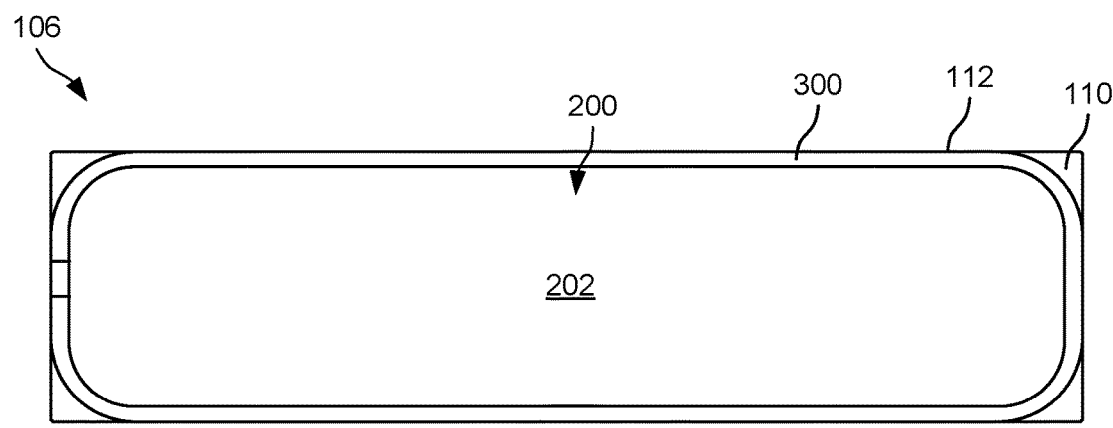
FIG. 3B illustrates a rear planar view of the lens housing of FIG. 2, according to an example of the present disclosure.

FIG. 3A and FIG. 3B illustrate a front view and a back view of the lens housing 106, respectively, according to examples of the present disclosure. As shown, the lens housing 106 may be substantially rectangular in shape (e.g., in the X-Y plane). The exterior surface 126 (formed via the first portion 110) may be substantially smooth and planar. The interior surface 202 may additionally be substantially smooth and planar for receiving the Fresnel lens array 108. In some instances, the Fresnel lens array 108 may couple to a portion of, or an entirety of, the interior surface 202 within the second portion 112. Moreover, the second portion 112 may include an annulus 300 that provides access to the cavity 200 (e.g., for coupling the Fresnel lens array 108 to the interior surface 202) and/or through which the IR sensor(s) are capable of being disposed.

The second portion 112 is also shown extending from the first portion 110, and at least partially forms the cavity 200 within which the IR sensor(s) are configured to at least partially reside. In some instances, the first portion 110 may be rectangular shaped, while the second portion 112 may be rectangular shaped with curved edges. As such, in some instances, the first portion 110 may include a perimeter that is greater than the perimeter of the second portion 112 (e.g., in the X-Y plane).

In some instances, the lens housing 106 includes curved regions for directing light to the IR sensor(s) and/or increasing a FoV of the IR sensor(s). For example, a first curved region 302 may be disposed proximate to, or at, the first side 114, while a second curved region 304 may be disposed proximate to, or at, the second side 116. A center region 306, disposed between the first curved region 302 and the second curved region 304, may be substantially planar. The first curved region 302 may extend a first distance across the front 122 of the lens housing 106 (or the first portion 110), and the second curved region 304 may extend a second distance across the front 122 of the lens housing 106 (or the first portion 110). The first distance and the second distance may be substantially equal. Additionally, the center region 306 may extend a third distance, which may be greater than the first distance and the second distance respectively. As will be explained herein, the first curved region 302 and the second curved region 304 may curve in a direction from the front 122 to the back 124 of the lens housing 106 (e.g., in the Z-direction).

Figure 4A:
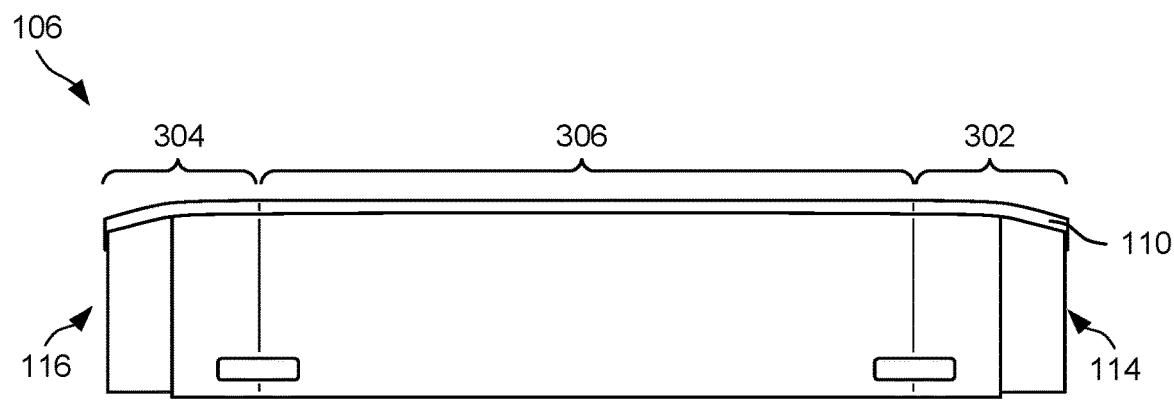
FIG. 4A illustrates a top planar view of the lens housing of FIG. 2, according to an example of the present disclosure.
Figure 4B:
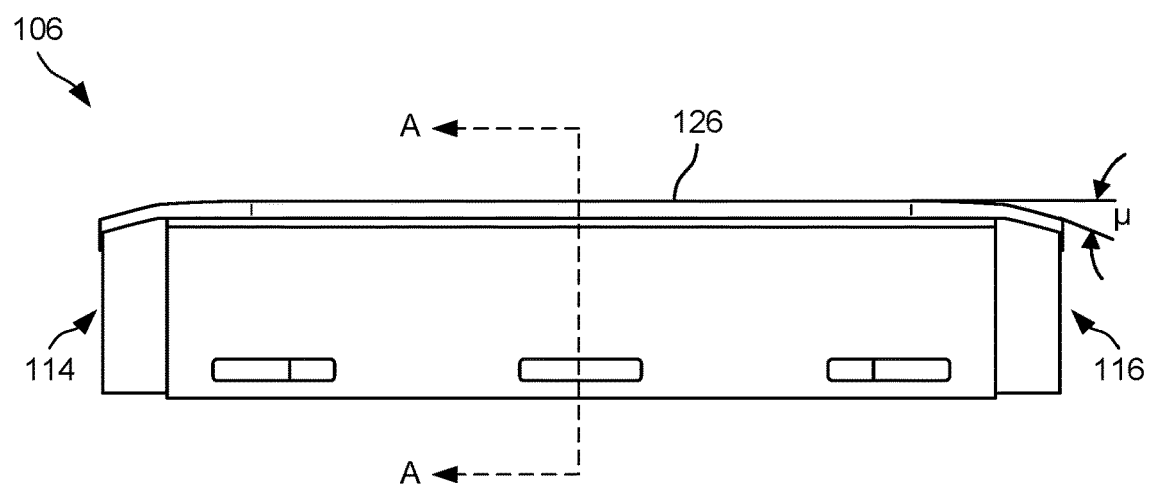
FIG. 4B illustrates a bottom planar view of the lens housing of FIG. 2, according to an example of the present disclosure.

FIG. 4A and FIG. 4B illustrate a top view and a bottom view of the lens housing 106, according to examples of the present disclosure. In some instances, the exterior surface 126 is substantially planar along a portion of a width of the lens housing 106, from the first side 114 to the second side 116. For example, the first portion 110 my include the center region 306 that is substantially planar.

Additionally, as introduced above, the first portion 110 includes the first curved region 302 and the second curved region 304. In doing so, and as shown in FIGS. 4A and 4B, a portion of the exterior surface 126 along the front 122 may curve in the Z-direction. In some instances, the exterior surface 126 along the first curved region 302 and/or the second curved region 304 may be disposed at an angle μ relative to the center region 306. In some instances, the angle μ may be between approximately five degrees and fifteen degrees. However, other angles are envisioned, and in some instances, parts of the first curved region 302 and/or the second curved region 304 may be disposed at different angles. For example, a first length of the first curved region 302 may be disposed at a first angle, while a second length of the first curved region 302 may be disposed at a second angle that is different than the first angle. In some instances, the center region 306 may be disposed across a greater portion of the width of the lens housing 106 than the first curved region 302 and/or the second curved region 304, respectively.

Figure 6:
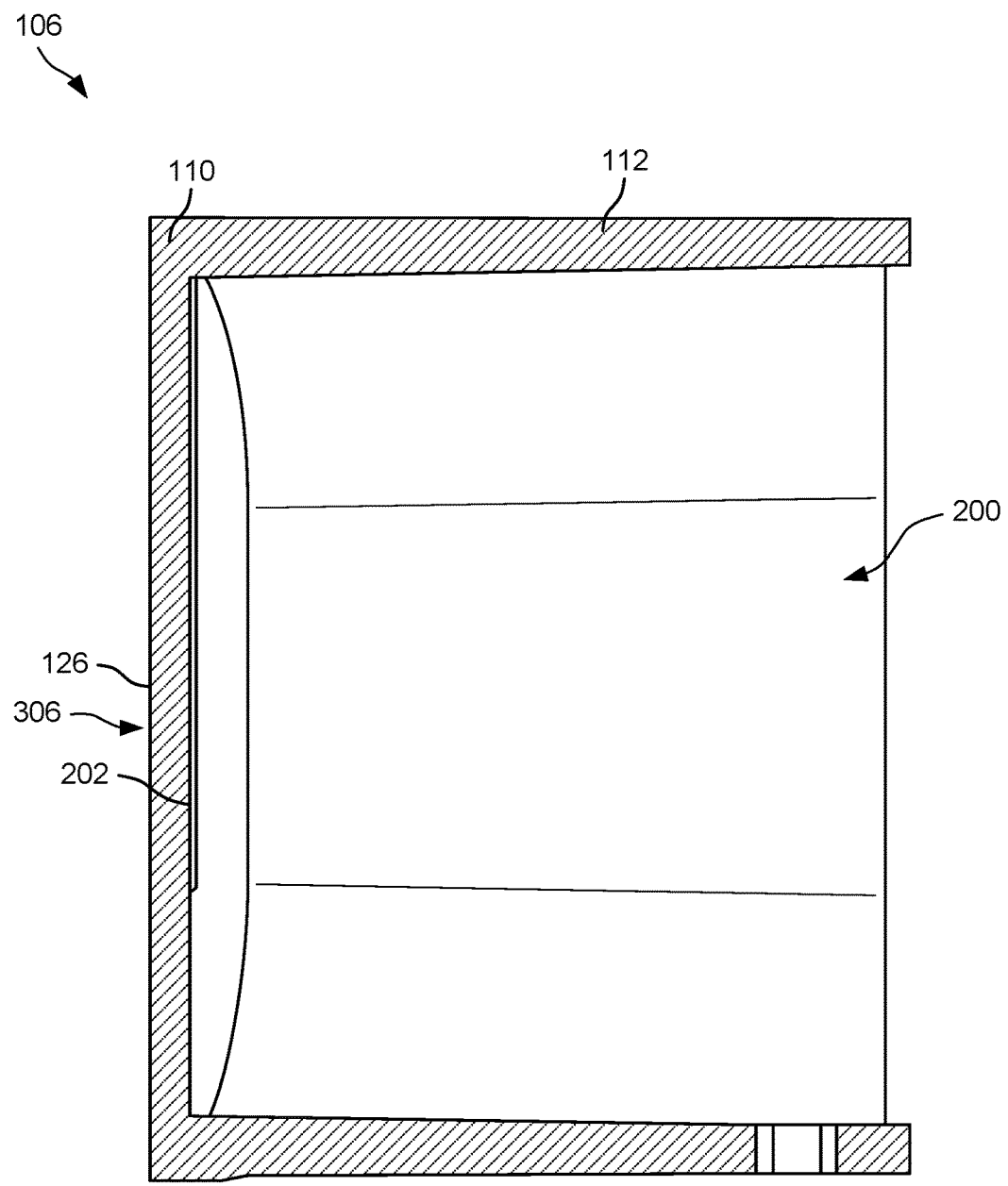
FIG. 6 illustrates a first cross-sectional view of the lens housing of FIG. 2, taken along line A-A of FIG. 4B, according to an example of the present disclosure.

A line A-A is shown in FIG. 4B, which is used to illustrate a cross-sectional view of the Fresnel lens array 108 in FIG. 6.

Figure 5A:
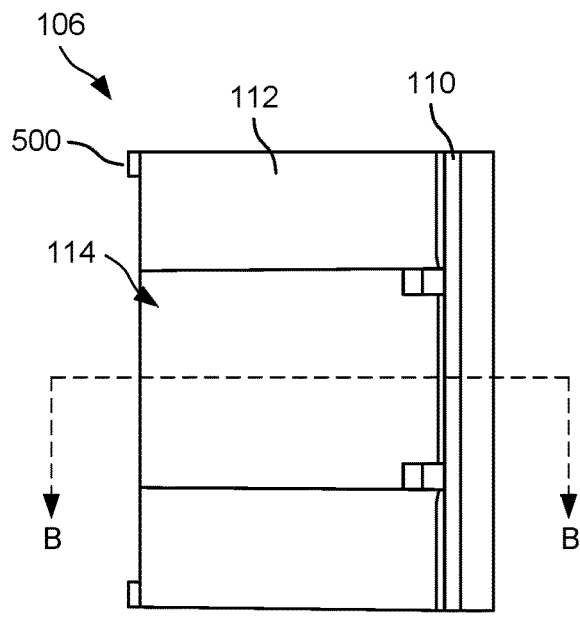
FIG. 5A illustrates a planar view of a first side of the lens housing of FIG. 2, according to an example of the present disclosure.
Figure 5B:
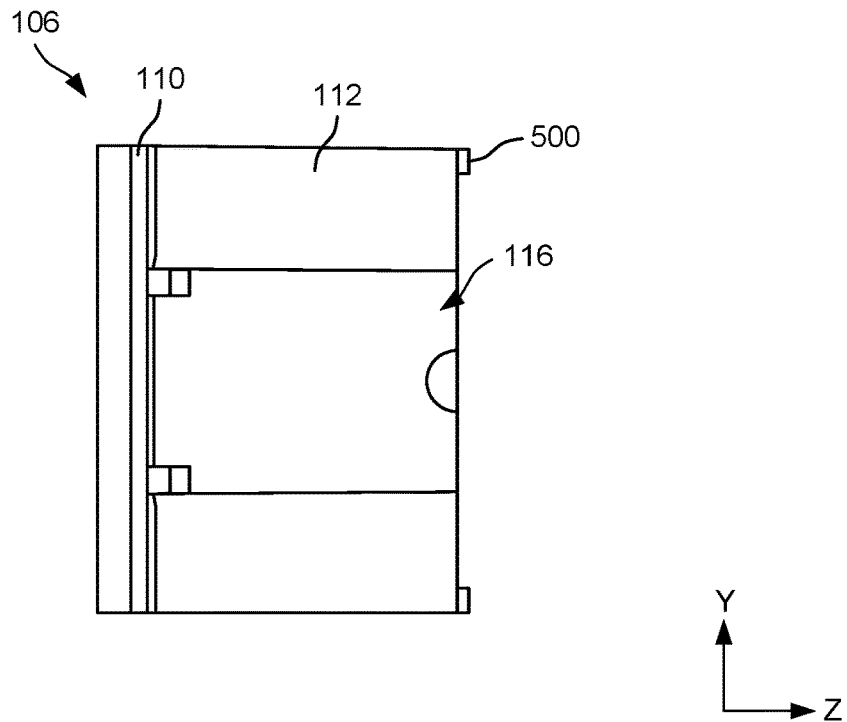
FIG. 5B illustrates a planar view of a second side of the lens housing of FIG. 2, according to an example of the present disclosure.

FIG. 5A and FIG. 5B illustrate side views of the lens housing 106, according to examples of the present disclosure. FIG. 5A illustrates the first side 114 of the lens housing 106, while FIG. 5B illustrates the second side 116 of the lens housing 106. The lens housing 106 includes the first portion 110 and the second portion 112. The first portion 110 includes the first curved region 302 disposed proximate to the first side 114, and the second curved region disposed proximate to the second side 116. In some instances, the second portion 112 may include prongs or tabs 500 that align the lens housing 106 within and/or on the device 100 (once assembled).

Figure 7:
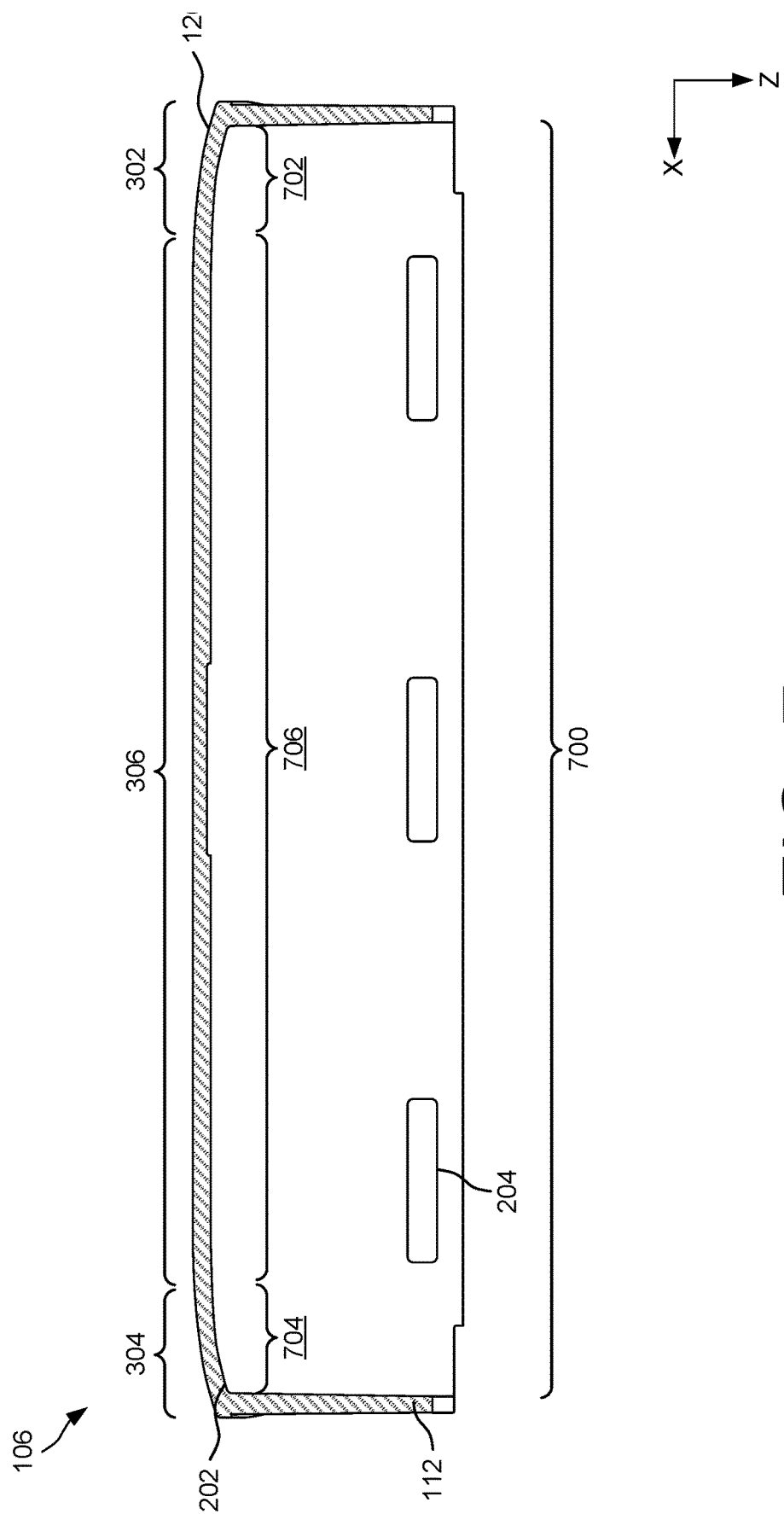
FIG. 7 illustrates a second cross-sectional view of the lens housing of FIG. 2, taken along line B-B of FIG. 5A, according to an example of the present disclosure.

A line B-B is shown in FIG. 5A, which is used to illustrate a cross-sectional view of the Fresnel lens array 108 in FIG. 7.

FIG. 6 illustrates a cross-sectional view of the lens housing 106, taken along line A-A of FIG. 4B, according to examples of the present disclosure. The lens housing 106 includes the first portion 110, the second portion 112, and the cavity 200 defined within the second portion 112. The exterior surface 126 of the lens housing 106, along the center region 306, is shown being substantially planar. Additionally, the interior surface 202 of the lens housing 106, opposite the exterior surface 126, may be substantially planar for receiving the frontal surface of the Fresnel lens array 108. However, in some instances, the frontal surface of the Fresnel lens 108 may include similar curved regions as the lens housing 106. When coupled to the interior surface 202, the Fresnel lens array 108 may be disposed within the sidewall(s) of the second portion 112.

FIG. 7 illustrates a cross-sectional view of the lens housing 106, taken along line B-B of FIG. 5A, according to examples of the present disclosure. The exterior surface 126 of the lens housing 106 is shown being substantially planar along the center region 306 and curved along the first curved region 302 and the second curved region 304. Additionally, the interior surface 202 of the lens housing 106, opposite the exterior surface 126, may be substantially planar for receiving the frontal surface of the Fresnel lens array 108. In some instances, the interior surface 202 includes a width 700 disposed between the second portion 112 (e.g., opposing sidewalls of the second portion 112). When coupled to the interior surface 202, the Fresnel lens array 108 may be disposed across the width 700, or a portion of a width 700. That is, in some instances, the Fresnel lens array 108 may be coupled to an entirety of the interior surface 202, or a portion thereof (e.g., less than the width 700).

Further, in some instances, the interior surface 202 may be curved at locations disposed beneath or behind (e.g., in the Z-direction) the first curved region 302 and/or the second curved region 304, respectively. For example, as shown, a first section 702 of the interior surface 202 behind the first curved region 302 may curve. In some instances, a curvature of the first section 702 may correspond to a curvature of the first curved region 302. Additionally, a second section 704 of the interior surface 202 behind the second curved region 304 may curve. In some instances, a curvature of the second section 704 may correspond to a curvature of the second curved region 304. Additionally, a third section 706, disposed between the first section 702 and the second section 704 may be planar. In some instances, a thickness of the first portion 110 may be consistent across a width of the first portion 110 (e.g., in the X-direction).

The slots 204 are further shown extending through the second portion 112 for coupling and/or aligning the lens housing 106 to the device.

Figure 8A:
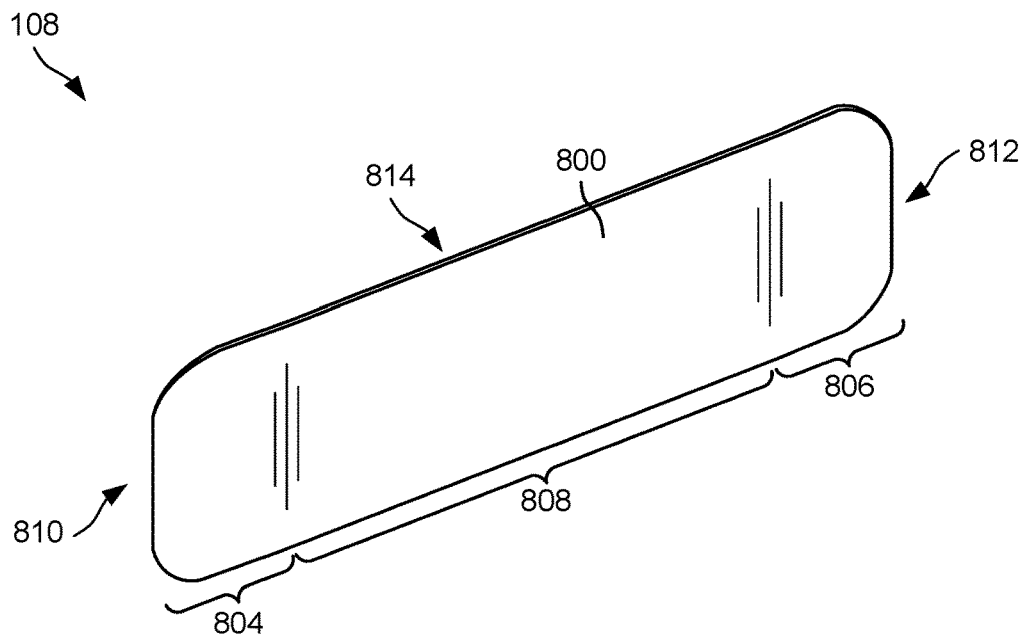
FIG. 8A illustrates a first perspective view of an example Fresnel lens array of the lens assembly of FIG. 1, according to an example of the present disclosure.
Figure 8B:
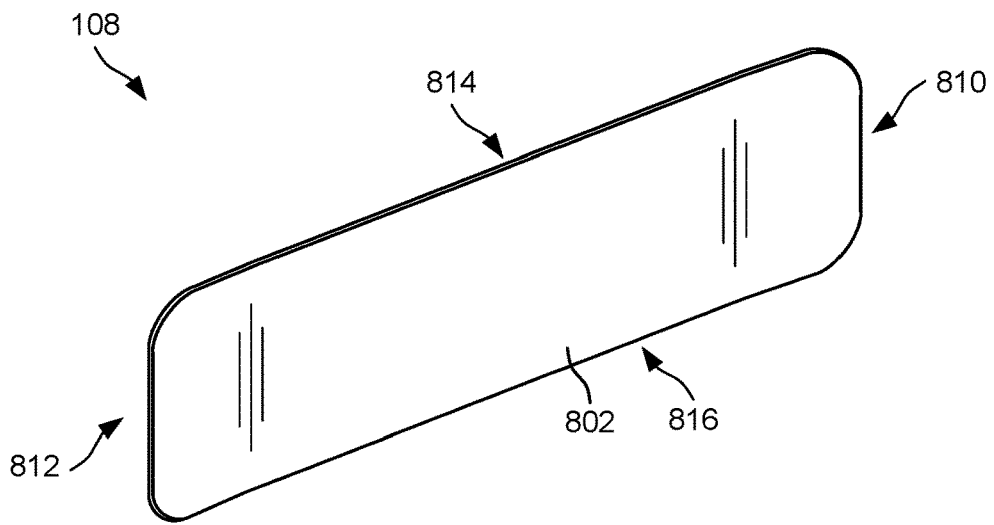
FIG. 8B illustrates a second perspective view of the Fresnel lens array of FIG. 8A, according to an example of the present disclosure.
Figure 8C:
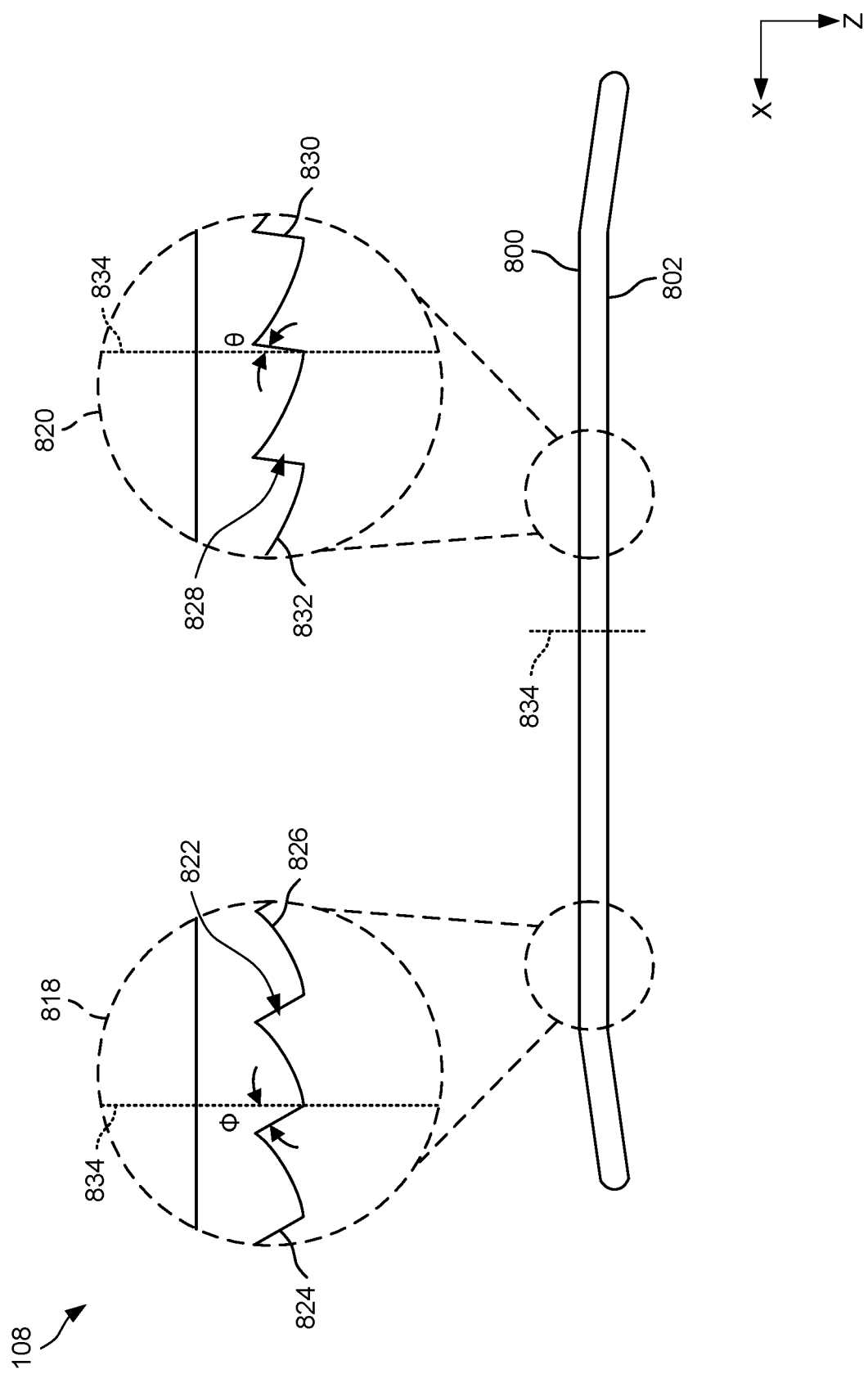
FIG. 8C illustrates a top view of the Fresnel lens array of FIG. 8A, showing example concentric grooves disposed within the Fresnel lens array, according to an example of the present disclosure.

FIGS. 8A-8C illustrate various views of the Fresnel lens array 108, according to examples of the present disclosure. FIG. 8A illustrates a front perspective view of the Fresnel lens array 108, FIG. 8B illustrates a rear perspective view of the Fresnel lens array 108, and FIG. 8C illustrates a top view of the Fresnel lens array 108.

The Fresnel lens array 108 includes a frontal surface 800 and a rearward surface 802, opposite the frontal surface 800 (e.g., spaced apart in the Z-direction). As discussed above, the frontal surface 800 may couple to the interior surface 202, or a portion thereof, within the second portion 112 of the lens housing 106. The rearward surface 802 may include concentric grooves having peaks and valleys (not shown in FIGS. 8A and 8B).

In some instances, the frontal surface 800, or more generally the Fresnel lens array 108, may include a shape, contour, and so forth that is complimentary to the interior surface 202. For example, the Fresnel lens array 108 may include a first curved section 804 and a second curved section 806 that are complimentary to the curvature of the first section 702 and the second section 704 of the interior surface 202, respectively. In some instances, the Fresnel lens array 108 may be curved along such sections, or alternatively, the frontal surface 800 may be curved while the rearward surface 802 may be planar. A central section 808, disposed between the first curved section 804 and the second curved section 806, may be substantially planar.

In addition to the frontal surface 800 and the rearward surface 802, the Fresnel lens array 108 includes a first side 810, a second side 812 spaced apart from the first side 810 (e.g., in the X-direction), a top 814, and a bottom 816 opposite the top 814 (e.g., in Y-direction). A width of the Fresnel lens array 108 may extend between the first side 810 and the second side 812. The width of the Fresnel lens array 108 resides within the width 700 of the interior surface 202. In some instances, the frontal surface 800 of the Fresnel lens array 108 may engage with less than a portion of the interior surface 202. As will be discussed herein, the Fresnel lens array 108 is formed via a plurality of individual lens elements that couple together. In some instances, the lens elements include a first surface that corresponds to the frontal surface 800, and a second surface that corresponds to the rearward surface 802. That is, when coupled together, the lens elements may form the frontal surface 800 and the rearward surface 802.

The Fresnel lens array 108 further includes a central vertical plane 834 (Y-Z plane) disposed centrally through the Fresnel lens array 108. As will be explained herein, the concentric grooves of the Fresnel lens array 108 may be disposed at an angle relative to the central vertical plane 834. For example, translation edges of the concentric grooves may be disposed at an angle relative to the central vertical plane 834. Further, the design of the Fresnel lens array 108 is configured to direct off-axis light rays, having high incident angles on the exterior surface 126, or relative to the central vertical plane 834, towards the IR sensor(s). Although the translation edges are described as being in relation to the central vertical plane 834, the translation edges may be relative to a center point of the concentric grooves formed within the individual lens elements. Here, the concentric grooves may be disposed about the center point, and the translation edges may be disposed at a given angle relative to the center point.

Example detailed cross-sectional views of the Fresnel lens array 108 are shown in FIG. 8C. As discussed herein, the rearward surface 802 of the Fresnel lens array 108 may include concentric grooves having translation edges and facets, and compared to one another, different lens elements of the Fresnel lens array 108 may include differently angled translation edges and/or shaped facets. For example, in a first detailed view 818, first concentric grooves 822 are shown. The first concentric grooves 822 may be defined by first translation edges 824 and first facets 826. As shown, the first facets 826 extend between adjacent translation edges 824 of the first translation edges 824. In some instances, a length of the first facets 826, between the adjacent translation edges, are between approximately 5 micrometers and 10 micrometers. A length of the first translation edges 824 may be between approximately 5 micrometers and 10 micrometers. The first concentric grooves 822, for example, may be formed at an intersection between the individual translation edges of the first translation edges 824 and individual facets of the first facets 826. In some instances, the first translation edges 824 may be disposed at an angle Φ relative to the central vertical plane 834 (or relative to a center point about which the first concentric grooves 822 are disposed). In some instances, the angle Φ may be thirty degrees. However, in other instances, the angle Φ may be five degrees, ten degrees, forty five degrees, and so forth.

In a second detailed view 820, second concentric grooves 828 are shown. The second concentric grooves 828 may be defined by second translation edges 830 and second facets 832. As shown, the second facets 822 extend between adjacent translation edges of the second translation edges 830. In some instances, a length of the second facets 822, between the adjacent translation edges, are between approximately 5 micrometers and 10 micrometers. A length of the second translation edges 830 may be between approximately 5 micrometers and 10 micrometers. The second concentric grooves 828, for example, may be formed at an intersection between the individual translation edges of the second translation edges 830 and individual facets of the second facets 832. In some instances, the second translation edges 830 may be disposed at an angle θ relative to the central vertical plane 834 (or relative to a center point about which the second concentric grooves 828 are disposed). In some instances, the angle θ may be one degree. However, in other instances, the angle θ may be five degrees, ten degrees, forty five degrees, and so forth.

As shown, the first concentric grooves 822 and the second concentric grooves 828 are located at certain locations on the Fresnel lens array 108. The first concentric grooves 822 and the second concentric grooves 828 may be formed within a first lens element and a second lens element, respectively. The location of the first concentric grooves 822 and/or the second concentric grooves 828 (or the first lens element and the second lens element) are exemplary, and the first concentric grooves 822 and/or the second concentric grooves 828 may be located elsewhere on the Fresnel lens array 108. That is, as discussed herein, lens elements may form the Fresnel lens array 108, and the lens elements may have concentric grooves with differently angled translation edges. For example, some of the lens elements may have translation edges of thirty degrees, while other lens elements may have translation edges of one degree.

Although the translation edges are described as being thirty degrees, or approximately thirty degrees, other angles are envisioned. For example, the translation edges may be disposed at ten degrees, twenty degrees, forty degrees, and so forth. The angle of the translation edges may be based at least in part on a desired FOV of the IR sensor(s). Additionally, in some instances, the lens elements may have a combination of differently angled translation edges. For example, a lens element may include both translation edges disposed at thirty degrees and one degree. As such, lens elements are designed to direct light rays from different directions, or incident angles on the exterior surface, to the IR sensor(s) in order to monitor a desired FoV.

Figure 9:
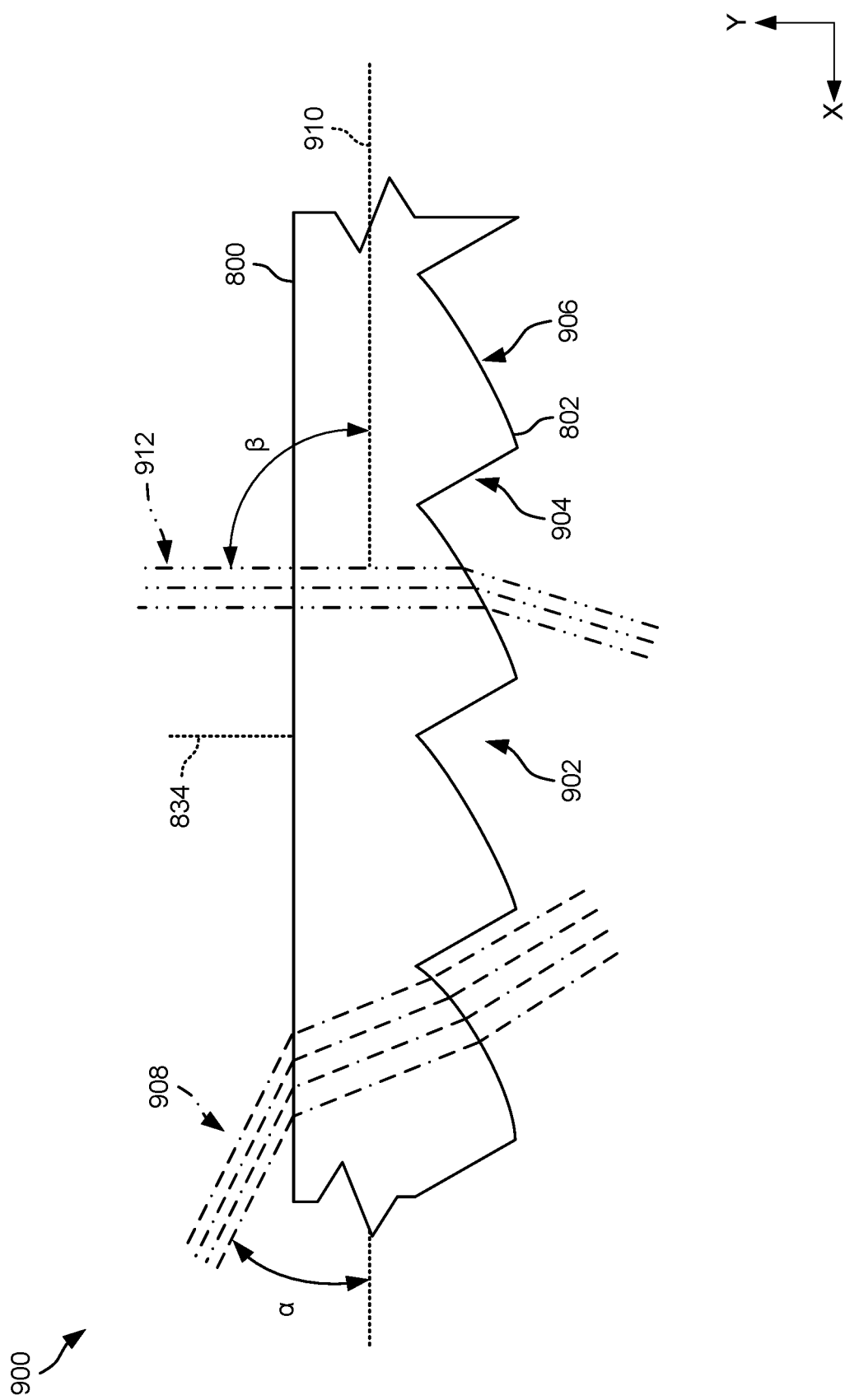
FIG. 9 illustrates an example lens element of the Fresnel lens array of FIG. 8A, according to an example of the present disclosure.

FIG. 9 illustrates, in cross-section, an example lens element 900 of the Fresnel lens array 108, according to examples of the present disclosure. The Fresnel lens array 108 includes the frontal surface 800 and the rearward surface 802. The rearward surface 802 includes concentric grooves 902, translation edges 904, and facets 906. In some instances, the concentric grooves 902 may be similar to the first concentric grooves 822, the translation edges 904 may be similar to the first translation edges 824, and the facets 906 may be similar to the first facets 826. For example, the translation edges 904 may be disposed at thirty degrees relative to the central vertical plane 834.

In some instances, angling the translation edges 904 at thirty degrees permits off-axis light rays having high incident angles to be directed to the IR sensor(s). For example, first light rays 908 are shown having a high incident angle α on the exterior surface 126 of the lens element 900. The angle α may be relative to a central horizontal plane 910 and/or the frontal surface 800 of the Fresnel lens array 108. In some instances, the angle α may be between ten degrees and thirty degrees. Although described as being in relation to the central horizontal plane 910, the first light rays 908 may be disposed at incident angles relative to the central vertical plane 834. For example, the first light rays 908 may be disposed at seventy degrees relative to the central vertical plane 834, and the translation edges 904 permit such first light rays to be directed towards the IR sensor(s).

As shown, the first light rays 908 may enter the lens element 900 at the frontal surface 800 and exit the lens element 900 at the rearward surface 802. Upon exiting the rearward surface 802, FIG. 9 illustrates the first light rays 908 do not impact (e.g., refract) off the translation edges 904. That is, by disposing the translation edges 904 at thirty degrees, for example, the first light rays 908 do not refract off the translation edges 904. Comparatively, if the translation edges 904 were disposed at a lesser angle, say one degree, upon exiting the rearward surface 802 of the lens element 900, a portion of the first light rays 908 would contact the translation edges 904. By contacting the translation edges 904, however, that portion of the first light rays 908 would be refracted to another location and not directed towards the IR sensor(s).

As further shown, on-axis light rays are permitted to pass through the lens element 900 and be directed towards the IR sensor(s). For example, second light rays 912 are shown having an angle β that may be normal to the central vertical plane 834 and/or parallel to the central vertical plane 834. The second light rays 912 may enter the lens element 900 at the frontal surface 800 and exit the lens element 900 at the rearward surface 802. Upon exiting the rearward surface 802, FIG. 9 illustrates the second light rays 912 are directed towards the IR sensor(s).

The lens element 900, which includes the translation edges 904 disposed at thirty degrees, for example, permits the lens element 900 to direct both on-axis and off-axis light rays to the IR sensor(s). In some instances, on-axis light rays may refer to those light rays that are normal to the exterior surface 126, while off-axis light rays may refer to those light rays that are at high-incident angles relative to the exterior surface 126 or the frontal surface 800. Further, the lens element 900 is exemplary, and as indicated above, the Fresnel lens array 108 may include both translation edges disposed at thirty degrees and one degree, for example. In this way, the Fresnel lens array 108 may direct those light rays having high incident angles on lateral sides of the Fresnel lens array 108 to the IR sensor(s) (e.g., on the first side 114 and the second side 116), as well as direct those light rays being on-axis to the IR sensor(s).

It is to be understood that the first light rays 908 and the second light rays 912 may arrive at the Fresnel lens array 108 following a transmission through the lens housing 106 (e.g., the first portion 110). Suitable materials for the first portion 110, or the lens housing 106, to permit such transmission include, for example, HDPE.

Figure 10:
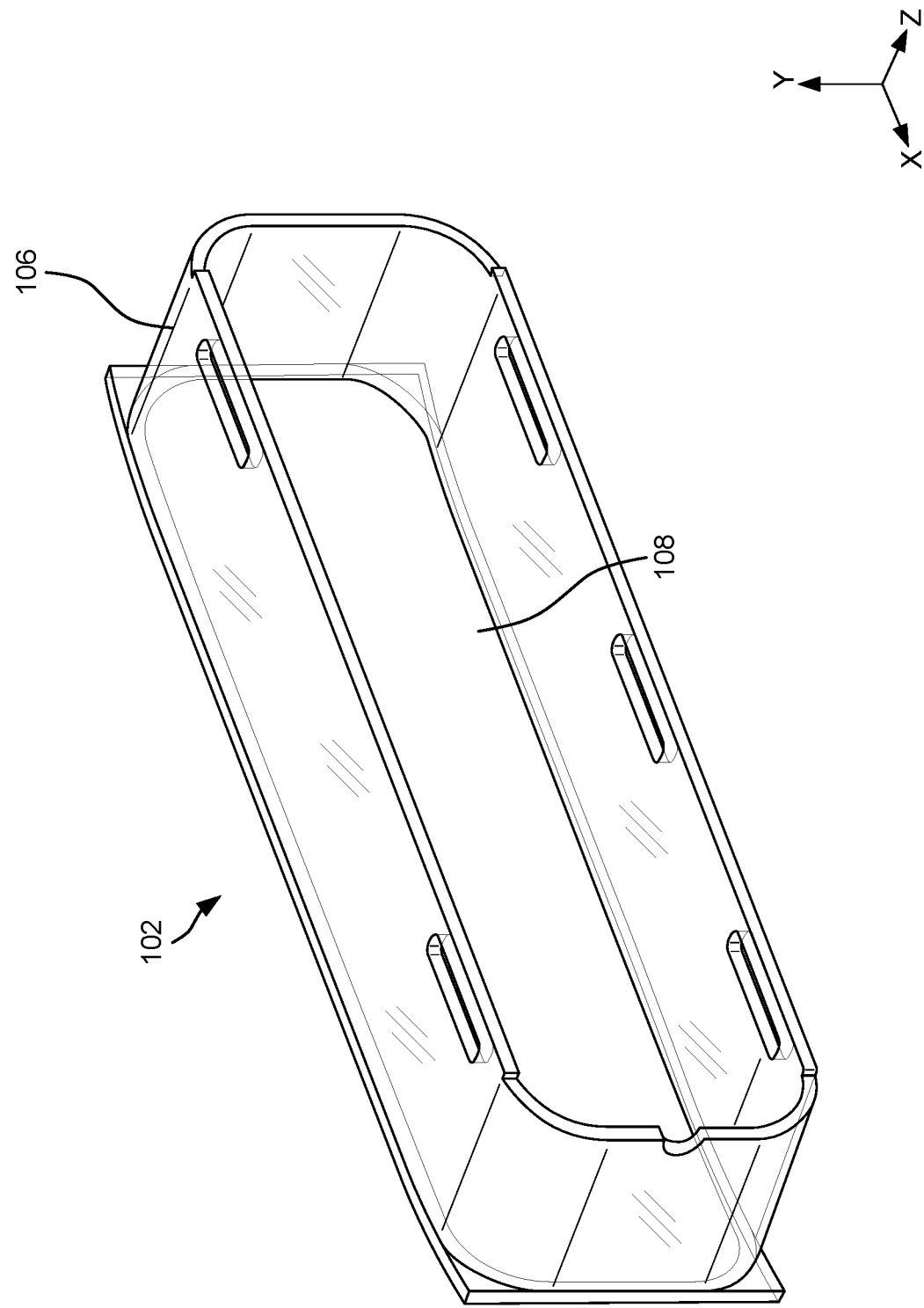
FIG. 10 illustrates the lens assembly of FIG. 1, showing the Fresnel lens array of FIG. 8A coupled to the lens housing of FIG. 2, according to an example of the present disclosure.

FIG. 10 illustrates the lens assembly 102, showing a coupling of the Fresnel lens array 108 to the lens housing 106, according to examples of the present disclosure. In FIG. 10, the lens housing 106 is shown as transparent to illustrate the coupling of the Fresnel lens array 108 to the lens housing 106. The frontal surface 800 of the Fresnel lens array 108 couples to the interior surface 202 of the lens housing 106, at a location within the second portion 112. Given that the Fresnel lens array 108 couples to the interior surface 202 of the lens housing 106, the lens housing 106 permits transmission of light rays. For example, the lens housing 106 may be formed from a material that permits the transmission of light rays to the Fresnel lens array 108. As such, the first portion 110 of the lens housing 106 permits light rays to pass therethrough, and to the Fresnel lens array 108. In some instances, the lens housing 106 (or the first portion 110) may be manufactured from high-density polyethylene (HDPE) and may be manufactured via injection molding.

Figure 11:
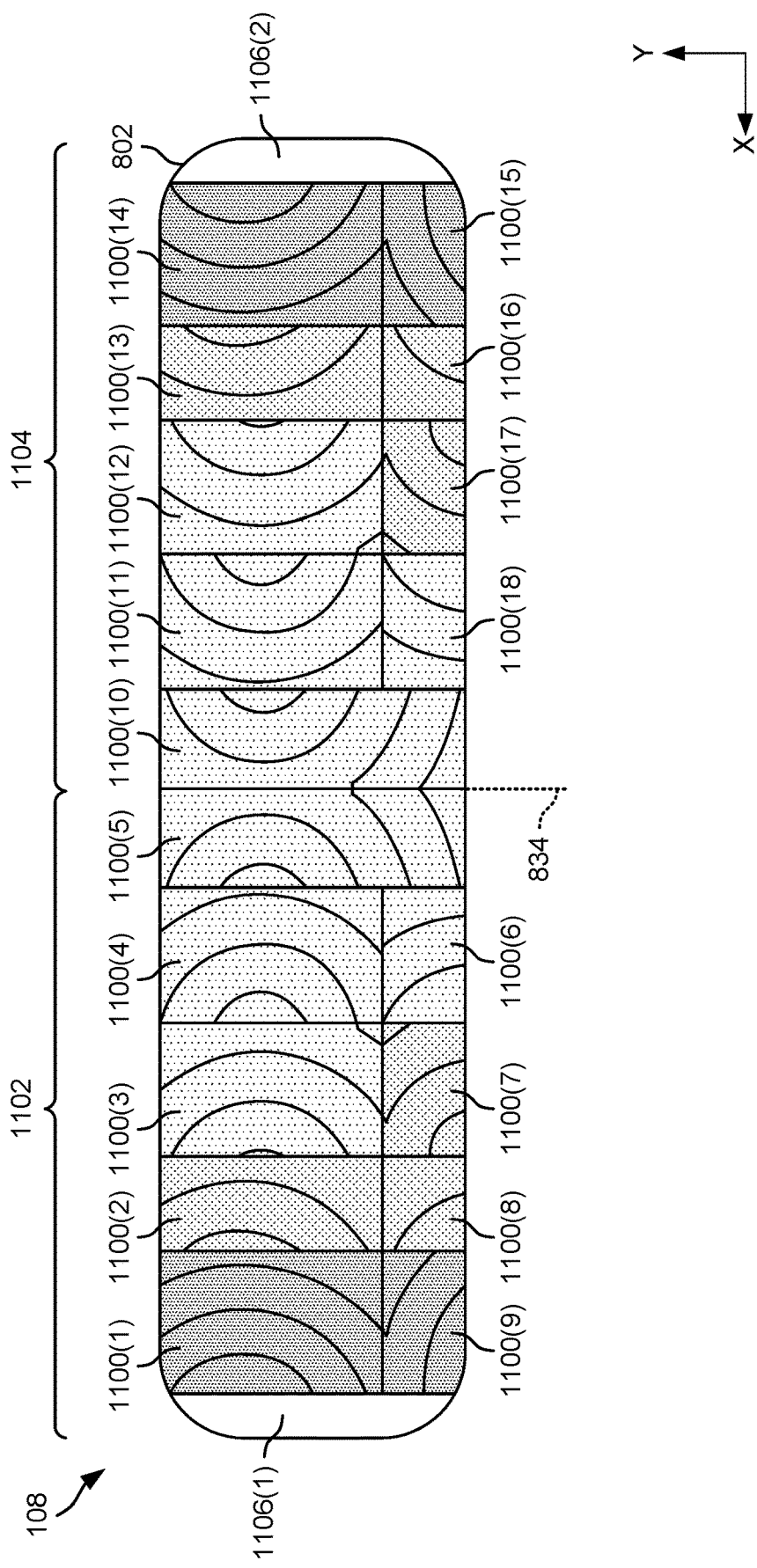
FIGS. 11-14 illustrate example lens elements of the Fresnel lens array of FIG. 8A, according to an example of the present disclosure.

FIG. 11 illustrates the rearward surface 802 of the Fresnel lens array 108, according to examples of the present disclosure. The Fresnel lens array 108 is made up of a plurality of lens elements 1100(1)-(18), such as the lens element 900 discuss hereinabove. In some instances, the lens elements 1100(1)-(18) are coupled together to form the Fresnel lens array 108. Alternatively, in some instances, the lens elements 1100(1)-(18) may be formed within a single piece of material to make up the Fresnel lens array 108. Each of the lens elements 1100(1)-(18) may represent a segment, or piece, of the Fresnel lens array 108.

In some instances, the lens elements 1100(1)-(18) are individually formed via a diamond lathe. For example, the concentric grooves may be formed in the lens elements 1100(1)-(18) via the diamond lathe, with the translation edges of the concentric grooves being formed at the desired angle. In some instances, the lens elements 1100(1)-(18) are formed from HDPE, silicon, germanium, zinc-sulfide, or zinc-selenide. In instances of manufacturing via injection molding, the grooves may be formed by diamond-turning the mold as a negative shape relative to that of the molded lens array.

In some instances, each of the plurality of lens elements 1100(1)-(18) may include concentric grooves. As will be explained herein, the concentric grooves may include respective center points that are different than one another. In doing so, the number of concentric grooves, a radius of the concentric grooves, a shape of the concentric grooves, and/or a concentric length of the grooves across the plurality of lens elements 1100(1)-(18) may be different. Each of the concentric grooves across the plurality of lens elements 1100(1)-(18) may include a respective center point, around which the concentric grooves are formed. In other words, each of the lens elements 1100(1)-(18) has a different lens center point around which the concentric grooves are disposed. Depending on the shape and/or size of the lens elements 1100(1)-(18), respectively, the concentric grooves may take different shapes, lengths, and so forth.

In some instances, the Fresnel lens array 108 may include a first half 1102 and a second half 1104. The first half 1102 and the second half 1104 may be symmetrical. For example, the Fresnel lens array 108 may include the central vertical plane 834 (Y-Z plane) disposed through a center of the Fresnel lens array 108. The first half 1102 and the second half 1104 (or the lens elements thereof), may be mirrored across the central vertical plane 834. As shown, the first half 1102 may include a first lens element 1100(1), a second lens element 1100(2), a third lens element 1100(3), a fourth lens element 1100(4), a fifth lens element 1100(5), a sixth lens element 1100(6), a seventh lens element 1100(7), an eighth lens element 1100(8), and a ninth lens element 1100(9). The lens elements 1100(1)-(9) may be disposed on a first side of the central vertical plane 834. The second half 1104 may include a tenth lens element 1100(10), an eleventh lens element 1100(11), a twelfth lens element 1100(12), a thirteenth lens element 1100(13), a fourteenth lens element 1100(14), a fifteenth lens element 1100(15), a sixteenth lens element 1100(16), a seventeenth lens element 1100(17), and an eighteenth lens element 1100(18). The lens elements 1100(10)-(18) may be disposed on a second side of the central vertical plane 834.

Each of the lens elements 1100(1)-(18) is configured to transmit light to the IR sensor(s) of the device 100. In some instances, the Fresnel lens array 108 may include non-lens elements 1106, such as a first non-lens element 1106(1) and/or a second non-lens element 1106(2). The non-lens elements 1106 may be disposed at the first side 810 and the second side 812 of the Fresnel lens array 108. In some instances, the non-lens elements 1106 may prohibit the transmission of light rays, but may provide a surface for coupling the Fresnel lens array 108 to the interior surface 202.

As introduced above, portions of the Fresnel lens array 108 may be curved to be complimentary with the curvature of the first curved region 302 and the second curved region 304, as well as the first curved section 804 and the second curved section 806, respectively. In some instances, the first lens element 1100(1), the ninth lens element 1100(9), and/or the first non-lens element 1106(1) may be disposed at, or along, the second curved section 806 of the Fresnel lens array 108. Additionally, the fourteenth lens element 1100(14), the fifteenth lens element 1100(6), and/or the second non-lens element 1106(2) may be disposed at, or along, the first curved section 804 of the Fresnel lens array 108. In some instances, The lens elements 1100(2)-(8), the lens elements 1100(10)-(13), and the lens elements 1100(16)-(18) may be disposed along the central section 808 of the Fresnel lens array 108.

As shown, the lens elements 1100(1)-(18) may include different shapes and/or sizes as compared to one another. For example, some of the lens elements 1100(1)-(18) may be square, rectangular, and so forth. Additionally, as will further be explained herein, the lens elements 1100(1)-(18) may include different widths and/or heights compared to one another. Certain lens elements of the lens elements 1100(1)-(18) may include different angled translation edges, as discussed above in FIGS. 8C and 9. For example, some of the lens elements 1100(1)-(18) may include concentric grooves having translation edges angled at one degree, while other lens elements may include concentric grooves having translation edges angled at thirty degrees. In some instances, given the differing angles of translation edges, the shape of the lens elements 1100(1)-(18), the size of the lens elements 1100(1)-(18), and/or the number of concentric grooves, the lens elements 1100(1)-(18) may include different focal lengths. However, the lens elements 1100(1)-(18) that make up the Fresnel lens array 108 may have a common focal point for sensing via the IR sensor(s). In some instances, the lens elements 1100(1)-(9) direct light rays to a first focal point for a first IR sensor and the lens elements 1100(10)-(18) direct light rays to a second focal point for a second IR sensor.

In some instances, the first lens element 1100(1), the second lens element 1100(2), the seventh lens element 1100(7), the eighth lens element 1100(8), and the ninth lens element 1100(9) may have translation edges of thirty degrees. Moreover, in some instances, the first lens element 1100(1) and the ninth lens element 1100(9) may have a focal length of twenty three mm. The second lens element 1100(2), the seventh lens element 1100(7), and the eighth lens element 1100(8) may have a focal length of ten mm. The third lens element 1100(3), the fourth lens element 1100(4), the fifth lens element 1100(5), and the sixth lens element 1100(6) may have translation edges of one degree. As such, in some instances, the lens elements 1100 that have concentric grooves with translation edges of thirty degrees may be disposed proximate to the second side 812 of the Fresnel lens array 108 for directing off-axis light rays with high incident angles towards the IR sensor(s). In doing so, a FoV of the IR sensor(s) may be increased given that light rays traveling from a left of the Fresnel lens array 108 may be directed to the IR sensor(s) (e.g., a first IR sensor). The lens elements 1100(1)-(18) are designed to direct light rays from different directions, or incident angles on the exterior surface 126, to the IR sensor(s) in order to monitor a desired FoV.

Likewise, given the symmetric nature of the Fresnel lens array 108, the thirteenth lens element 1100(13), the fourteenth lens element 1100(14), the fifteenth lens element 1100(15), the sixteenth lens element 1100(16), and the seventeenth lens element 1100(17) may have translation edges of thirty degrees. Moreover, in some instances, the fourteenth lens element 1100(14) and the fifteenth lens element 1100(15) may have a focal length of twenty three mm. The thirteenth lens element 1100(13), the sixteenth lens element 1100(16), and the seventeenth lens element 1100(17) may have a focal length of ten mm. The tenth lens element 1100(10), the eleventh lens element 1100(11), the twelfth lens element 1100(12), and the eighteenth lens element 1100(18) may have concentric grooves with translation edges of one degree. As such, in some instances, the lens elements that have concentric grooves with translation edges of thirty degrees may be disposed proximate to the first side 810 of the Fresnel lens array 108 for directing off-axis light rays with high incident angles towards the IR sensor(s) (e.g., a second IR sensor). In doing so, a FoV of the IR sensor(s) may be increased given that light rays traveling from a left of the Fresnel lens array 108 may be directed to the IR sensor(s).

Figure 12:
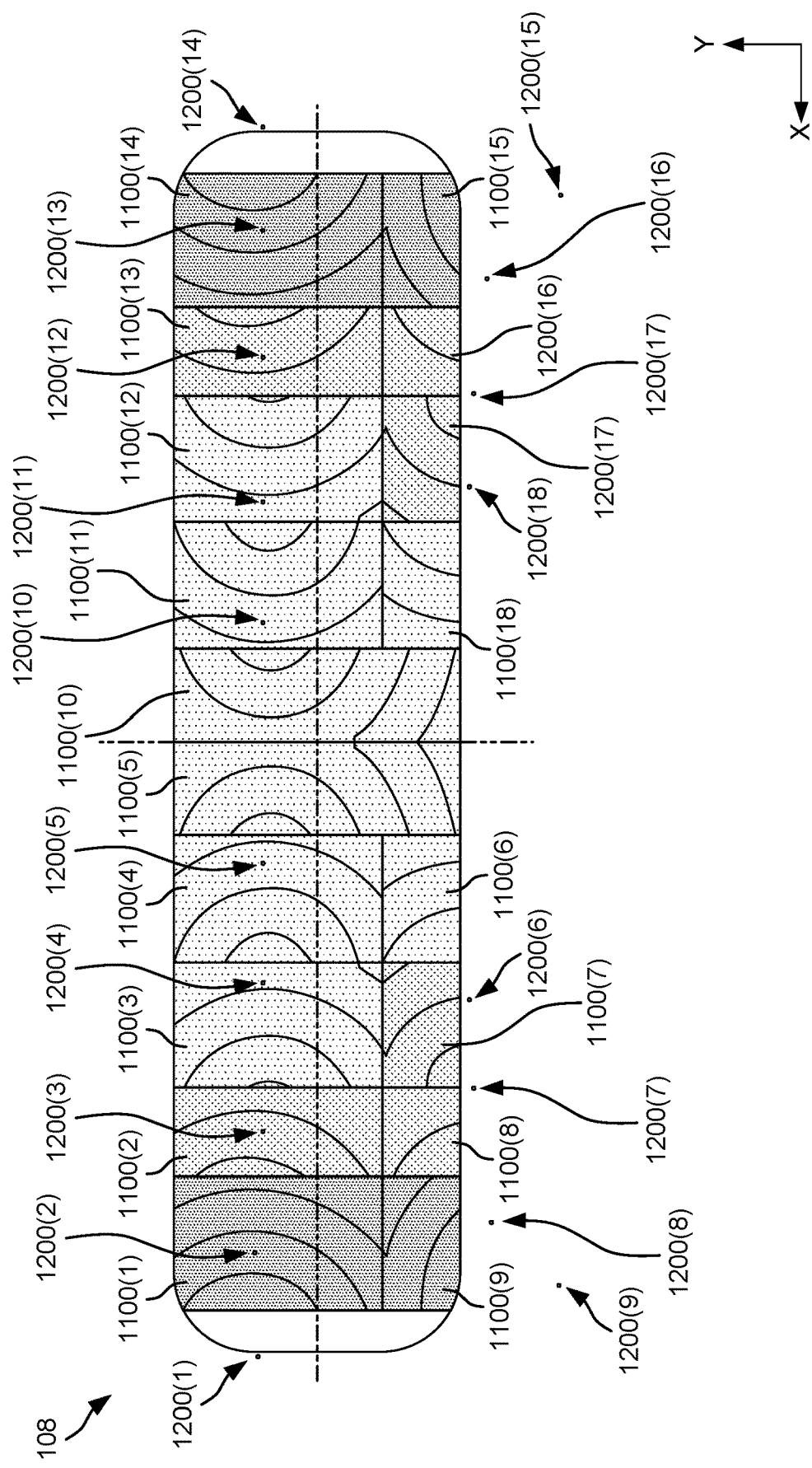

FIG. 12 illustrates center points of the concentric grooves of the lens elements 1100(1)-(18) of the Fresnel lens array 108, according to examples of the present disclosure. As introduced above, the lens elements 1100(1)-(18) may collectively form the Fresnel lens array 108, and the lens elements 1100(1)-(18) may include concentric grooves having different center points. In doing so, and based on the shape and/or size of lens elements 1100(1)-(18), respectively, the lens elements 1100(1)-(18) may include a different number of concentric grooves, a different length of the concentric grooves, and/or a different shape of concentric grooves.

The lens elements 1100(1)-(18) may include center points 1200(1)-(18), respectively. The first lens element 1100(1) may include first concentric grooves arranged about a first center point 1200(1), the second lens element 1100(2) may include second concentric grooves arranged about a second center point 1200(2), the third lens element 1100(3) may include third concentric grooves arranged about a third center point 1200(3), and so on. The center points 1200(1)-(18) may be defined as points on, or around, the Fresnel lens array 108. That is, the center points 1200(1)-(18) may not be actual points on the Fresnel lens array 108, but may correspond to points about which the concentric grooves of the lens elements 1100(1)-(18) are respectively defined. In other words, the concentric grooves of the first lens element 1100(1) may be concentric with the first center point 1200(1). However, given a shape and/or size of the first lens element 1100(1), only part of the concentric grooves may be formed within the first lens element 1100(1).

Figure 13:
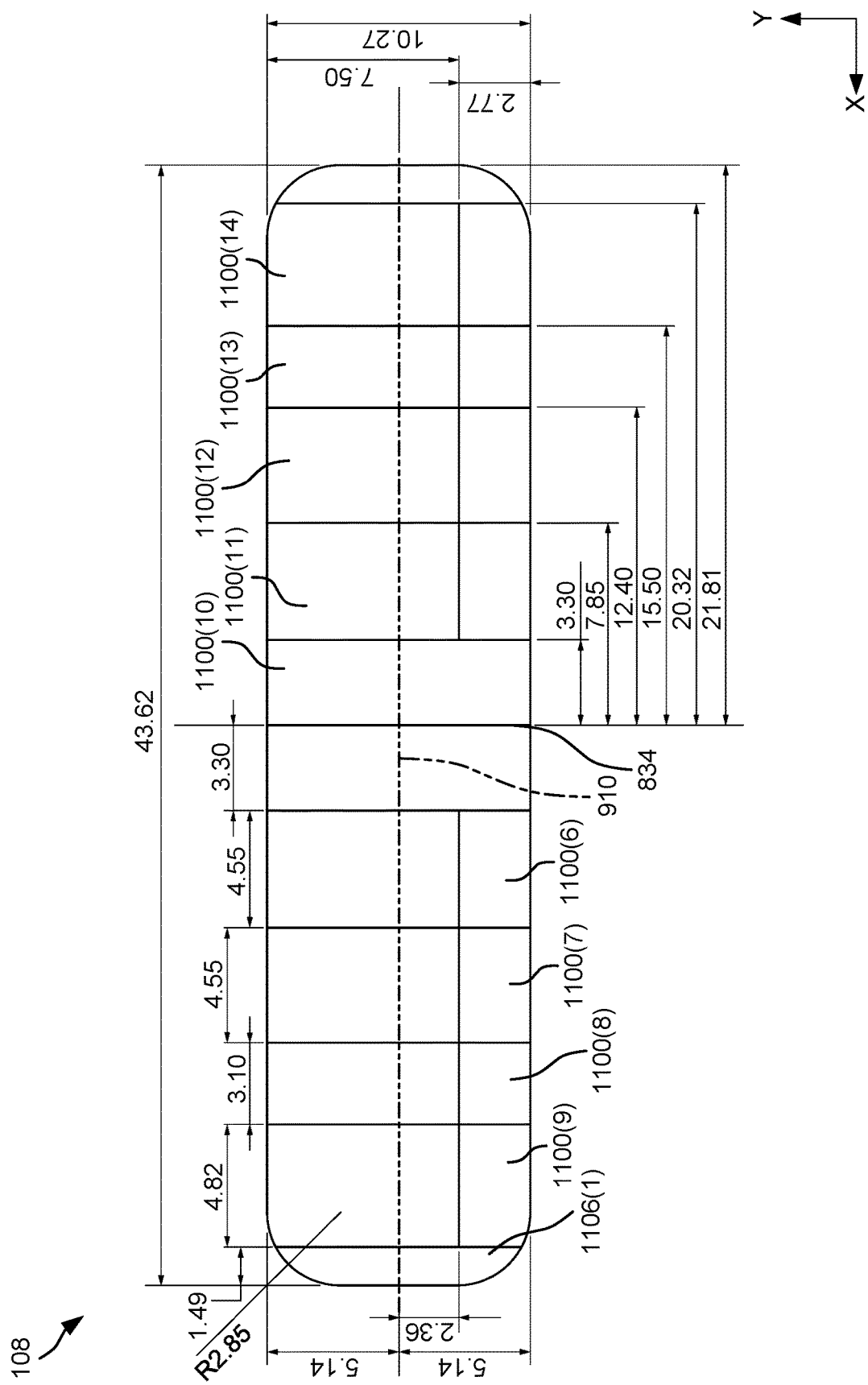

FIG. 13 illustrates a layout of the Fresnel lens array 108, showing sizes (mm) of the lens elements 1100(1)-(18), respectively, according to examples of the present disclosure. The sizes of the lens elements 1100(1)-(18) are shown in relation to the central vertical plane 834, the top 814 of the Fresnel lens array 108, the bottom 816 of the Fresnel lens array 108, the central horizontal plane 910 (e.g., X-Z plane), and/or one another. The sizes of the non-lens elements 1106 are further shown. The sizes of the lens elements 1100(6)-(9)

are shown, which may be the same as, or similar to, the lens elements 1100(15)-(18), respectively. Additionally, the sizes of the lens elements 1100(10)-(14) are shown, which may be the same as, or similar to, the lens elements 1100(1)-(5), respectively. The size of the first non-lens element 1106(1) is shown, which may be the same as, or similar to, the second non-lens element 1106(2).

Generally, in some instances, the width of the Fresnel lens array 108 may be approximately 43.62 millimeters (mm), and a height of the Fresnel lens array 108 may be approximately 10.27 mm. The lens elements 1100(1)-(18) and the non-lens elements 1106 collectively make up the width and the height of the Fresnel lens array 108. As also shown, the fifth lens element 1100(5) and the tenth lens element 1100 (10) may include a height that is equal to (or substantially equal to) the height of the Fresnel lens array 108. The sizes and dimensions shown in FIG. 13 are exemplary, and in some instances, some or a portion of the lens elements 1100(1)-(18) and/or the non-lens elements 1106 may include sizes and/or dimensions that are different than those illustrated.

Figure 14:
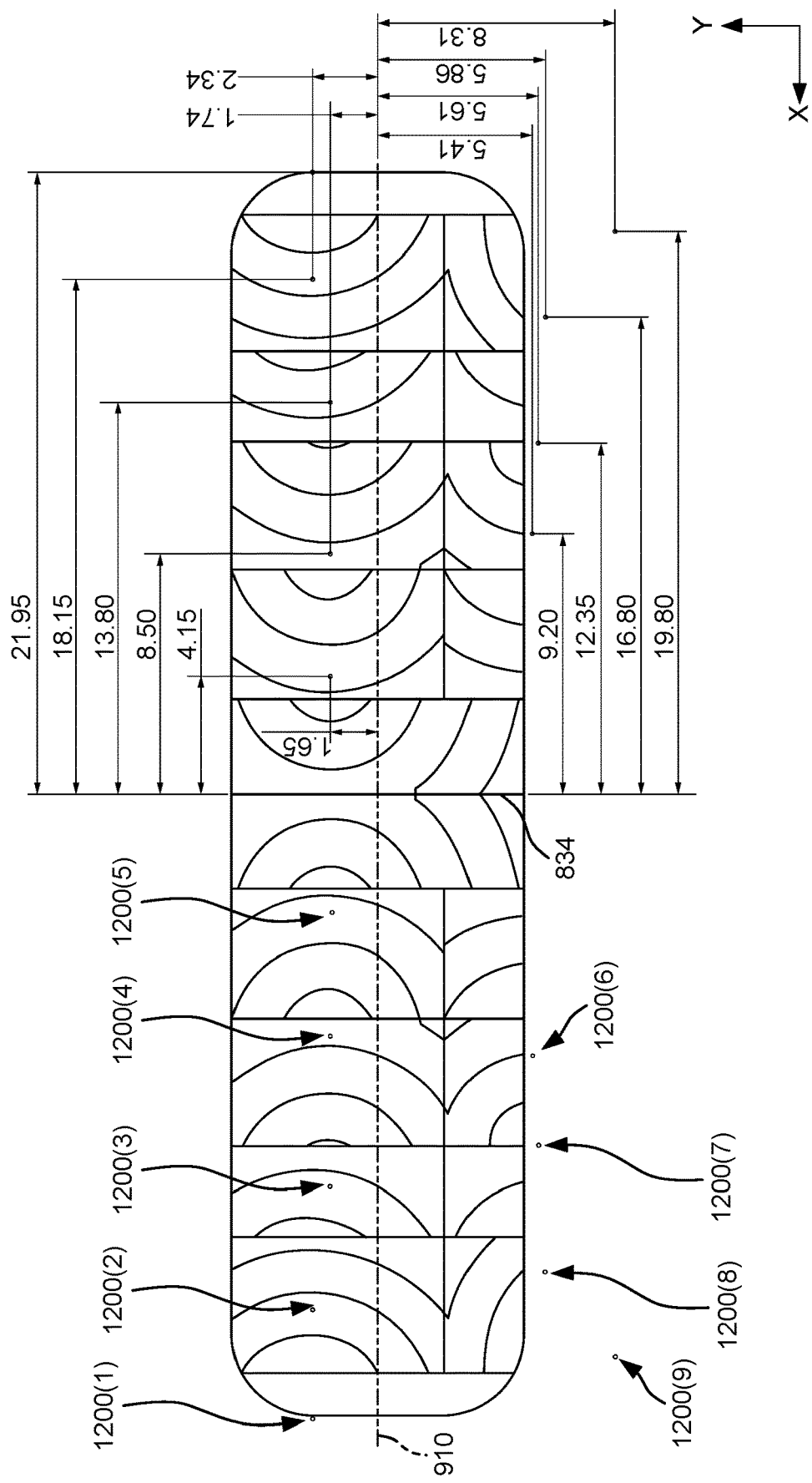

FIG. 14 illustrates a positioning of the center points 1200(1)-(18), according to examples of the present disclosure. The dimensions shown in FIG. 14 are in mm. In FIG. 14, the positioning of the center points 1200(1)-(18) for only one half of the Fresnel lens array 108, the first half 1102, are shown. That is, the positioning of the center points 1200 (1)-(9) are shown. However, given the symmetric nature of the Fresnel lens array 108, the center points 1200(10)-(18) may be posited similar to the center points 1200(1)-(9), respectively.

The location of the center points 1200(10)-(18) are shown in relation to the central vertical plane 834, the central horizontal plane 910 (X-Z plane), and/or one another. The location of the center points 1200(1)-(9) shown in FIG. 14 are exemplary, and in some instances, some or a portion of the lens elements 1100(1)-(9) may have center points that are located differently than shown.

Figure 15:
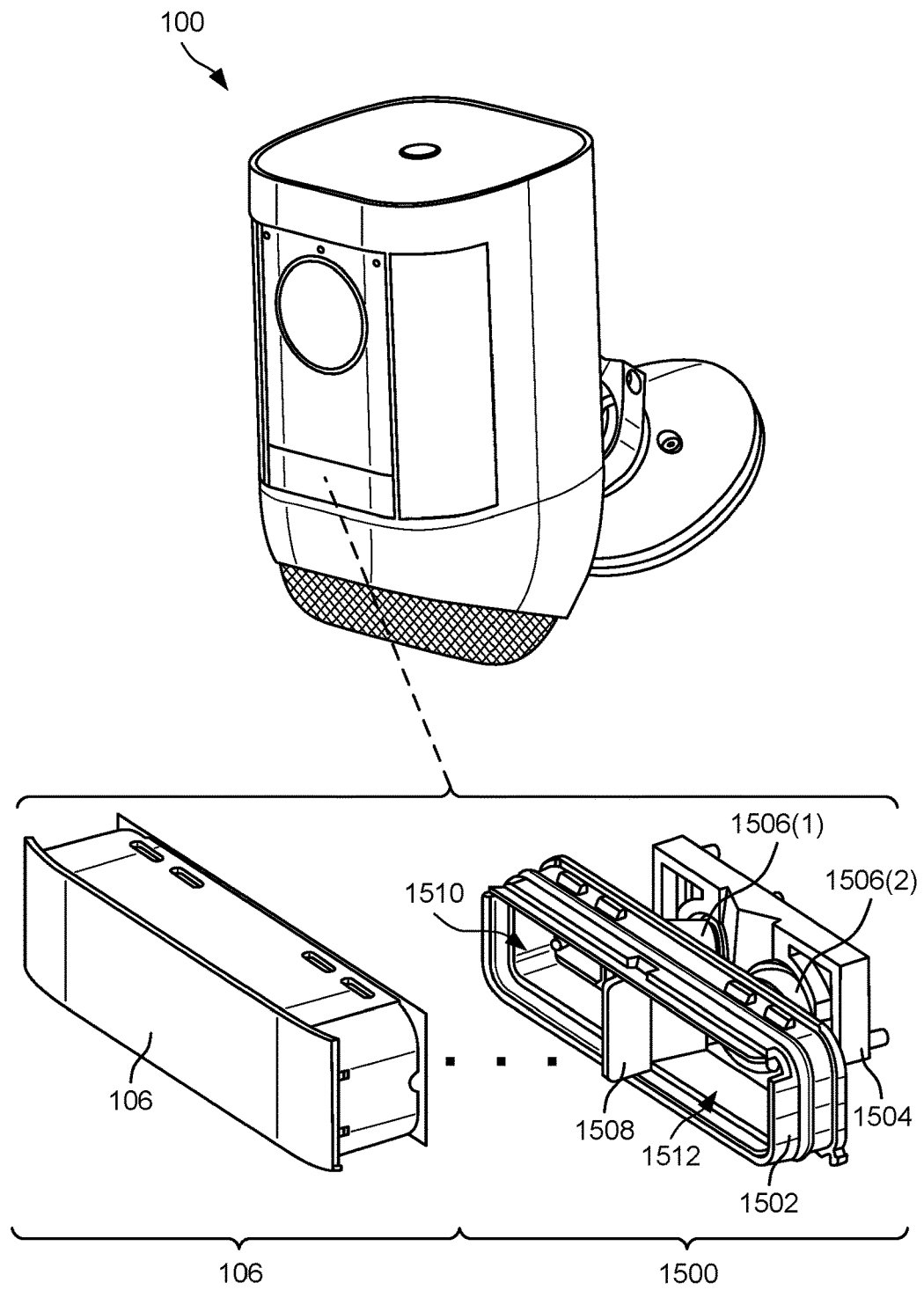
FIG. 15 illustrates an example sensor assembly of the device of FIG. 1 arranged to receive light rays via the lens assembly of FIG. 1, according to an example of the present disclosure.

FIG. 15 illustrates an example sensor assembly 1500 of the device 100 that is configured to receive light rays via the lens assembly 102, according to examples of the present disclosure.

The lens assembly 102, as discussed hereinabove, includes the lens housing 106 and the Fresnel lens array 108. The lens housing 106 includes the exterior surface 126 that forms a portion of the exterior surface of the device 100. The first portion 110 of the lens housing 106, or a portion thereof, is configured to permit light rays to traverse therethrough. In turn, the Fresnel lens array 108 may direct the light rays towards IR sensor(s) of the device 100.

The sensor assembly 1500 may include a frame 1502, a mount 1504, a first IR sensor 1506(1), and a second IR sensor 1506(2). In some instances, the first IR sensor 1506 (1) and the second IR sensor 1506(2) couple to the frame 1502 and/or the mount 1504. Additionally, in some instances, the first IR sensor 1506(1) and the second IR sensor 1506(2) may include PIR sensor(s). The first IR sensor 1506(1) and the second IR sensor 1506(2) may be disposed at least partially within the frame 1502. For example, a front portion of the first IR sensor 1506(1) and the second IR sensor 1506(2), respectively, may reside within the frame 1502. In some instances, a divider 1508 separates cavities of the frame 1502. For example, the frame 1502 may define a first cavity 1510 located in front of the first IR sensor 1506(1), and a second cavity 1512 located in front of the second IR sensor 1506(2). The divider 1508 is located between the first cavity 1510 and the second cavity 1512.

Moreover, as discussed above, the Fresnel lens array 108 includes the first half 1102 and the second half 1104. In some instances, the first half 1102 is disposed in front of the second IR sensor 1506(2), while the second half 1104 is disposed in front of the first IR sensor 1506(1). The first half 1102 directs light rays into the second cavity 1512 for being received by the second IR sensor 1506(2), while the second half 1104 directs light rays into the first cavity 1510 for being received by the first IR sensor 1506(1). As such, the first half 1102 of the Fresnel lens array 108 directs light rays to the second IR sensor 1506(2), while the second half 1104 of the Fresnel lens array 108 directs light rays to the first IR sensor 1506(1).

In some instances, the lens assembly 102 may couple to the frame 1502, while the frame 1502 and/or the mount 1504 may be coupled to components (e.g., frames, brackets, etc.) within the device 100. As such, the coupling between the lens housing 106 and frame 1502 may couple the lens assembly within the device 100.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A device, comprising:
a camera;
a wireless interface;
a passive infrared (PIR) sensor;
a lens assembly including:
a lens housing having:
an exterior surface,
an interior surface, and
a cavity; and
a Fresnel lens array including:
a first surface facing an exterior of the electronic device, and
a second surface facing an interior of the electronic device, the second surface having:
a plurality of lens facets, each lens facet comprising a curved face, and
a plurality of concentric grooves defined at least in part by translation edges and facets, and wherein a first portion of the plurality of concentric grooves includes first translation edges disposed at a first angle relative to a first plane, wherein the first plane is generally perpendicular to the first surface, and second portion of the plurality of concentric grooves includes second translation edges disposed at a second angle relative to a second plane, the first angle being substantially greater than zero, and the second angle being substantially less than the first angle.

2. The device of claim 1, wherein:
the first angle is approximately thirty degrees;
the second angle is approximately one degree;
a first translation edge of the first translation edges has a width of approximately 5 micrometers,
the second translation edges are located proximate a center of the lens array; and
the first translation edges are located proximate a perimeter of the lens array.

3. The device of claim 1, wherein the device comprises one or more computer readable media containing computer executable instructions for performing operations comprising:
receiving, at a controller of the device from an integrated circuit of the PIR sensor, a signal; and
based on the signal, powering up the camera.

4. A device, comprising:
a passive infrared (PIR) sensor;
a lens array including:
a first surface facing an exterior of the electronic device, and
a second surface facing an interior of the electronic device, the second surface having:
lens facets, and
translation edges, each translation edge extending between two lens facets;
wherein, for each respective translation edge of a first plurality of the translation edges, a cross-sectional profile of the respective translation edge of the first plurality of the translation edges is angled at a first angle relative to a first plane, and
wherein, for each respective translation edge of a second plurality of the translation edges, a cross-sectional profile of the respective translation edge of the second plurality of the translation edges is angled at a second angle relative to a second plane, the second angle being less than the first angle.

5. The device of claim 4, wherein:
each lens face comprises a curved surface; and
each translation edge comprises a flat surface.

6. The device of claim 4, wherein the first plane is generally perpendicular to the first surface.

7. The device of claim 4, wherein the first plane intersects the first surface or the second surface.

8. The device of claim 4, wherein the device further comprises a second PIR sensor, and a lens assembly including a lens housing having an exterior surface, an interior surface, and a cavity.

9. The device of claim 4, wherein the second angle is approximately one degree.

10. The device of claim 4, wherein the first angle is approximately thirty degrees.

11. The device of claim 4, wherein the second plurality of translation edges are located proximate a center of the lens array.

12. The device of claim 4, wherein the first plurality of translation edges are located proximate a perimeter of the lens array.

13. The device of claim 4, wherein
the second plurality of the translation edges are located proximate a center of the lens array; and
the first plurality of the translation edges are located proximate a perimeter of the lens array along a first side of the lens array.

14. The device of claim 4, wherein the first angle is substantially greater than zero.

15. The device of claim 4, wherein the device comprises a video doorbell.

16. The device of claim 4, wherein the device comprises a radar sensor.

17. The device of claim 4, wherein the device comprises one or more computer readable media containing computer executable instructions for performing operations comprising:
receiving, at a controller of the device from an integrated circuit of the PIR sensor, a signal; and
based on the signal, powering up a camera of the device.

18. The device of claim 4, wherein the device comprises one or more computer readable media containing computer executable instructions for performing operations comprising:
initiating recording by a camera of the device based on data generated by the PIR sensor.

19. The device of claim 4, wherein:
each lens face includes a curved surface; and
each translation edge comprises a flat surface.

20. The device of claim 4, wherein the first plane is generally perpendicular to the first surface.

21. The device of claim 4, wherein the first plane extends between opposite lengthwise edges of the second surface.

22. The device of claim 4, wherein the first plane intersects the first surface or the second surface.

23. A lens array, comprising:
a first surface, and
a second surface including:
lens facets, and
translation edges, each translation edge extending between two lens facets,
wherein, for each respective translation edge of a first plurality of the translation edges, a cross-sectional profile of the respective translation edge of the first plurality of the translation edges is angled at a first angle relative to a first plane, and
wherein, for each respective translation edge of a second plurality of the translation edges, a cross-sectional profile of the respective translation edge of the second plurality of the translation edges is angled at a second angle relative to a second plane, the second angle being less than the first angle, wherein the first plane and the second plane are perpendicular to the first surface.

24. The lens array of claim 23, wherein the second angle is approximately one degree.

25. The lens array of claim 23, wherein the first angle is approximately thirty degrees.

26. The lens array of claim 23, wherein the second plurality of the translation edges are located proximate a center of the lens array.

27. The lens array of claim 23, wherein the first plurality of the translation edges are located proximate a perimeter of the lens array.

* * * * *